United States Patent

Bell et al.

[11] Patent Number: 6,156,114
[45] Date of Patent: Dec. 5, 2000

[54] TREATMENT OF DEAGGLOMERATED PARTICLES WITH PLASMA-ACTIVATED SPECIES

[75] Inventors: Timothy Allan Bell; Wronald Scott Best; Michael Patrick Chouinard, all of Wilmington; Paul Francis Herman; James Lewis Hohman, Jr., both of Newark, all of Del.; Laurence J. Levase, Thornton, Pa.; Tyau-Jeen Lin, Chadds Ford, Pa.; An-Gong Yeh, Broomall, Pa.; Thomas William Harding, Wilmington, Del.

[73] Assignee: E. I. du Pont de Nemours and Company, Wilmington, Del.

[21] Appl. No.: 09/125,059

[22] PCT Filed: Feb. 6, 1997

[86] PCT No.: PCT/US97/01629

§ 371 Date: Aug. 4, 1998

§ 102(e) Date: Aug. 4, 1998

[87] PCT Pub. No.: WO97/29156

PCT Pub. Date: Aug. 14, 1997

Related U.S. Application Data

[63] Continuation-in-part of application No. 08/595,970, Feb. 6, 1996, abandoned.

[51] Int. Cl.$^7$ .......................... C23C 16/02; C23C 16/50; C09D 17/00; C09D 5/00; B05D 3/06
[52] U.S. Cl. .......................... 106/400; 427/536; 427/539; 427/560; 427/562; 427/565; 427/569; 427/575; 427/218; 427/212; 106/493; 106/499; 106/19 R
[58] Field of Search .......................... 427/491, 535, 427/536, 538, 537, 562, 564, 212, 213, 215, 218, 600, 601, 565, 447, 453, 446, 539, 560, 569, 575; 118/608, 612; 428/402; 106/19 R, 400, 493, 499

[56] References Cited

U.S. PATENT DOCUMENTS

| | | | |
|---|---|---|---|
| 3,573,090 | 3/1971 | Peterson | 427/453 |
| 4,397,885 | 8/1983 | Akai et al. | 427/562 |
| 4,478,643 | 10/1984 | Kuwahara et al. | 106/288 Q |
| 4,627,990 | 12/1986 | Saga et al. | 427/600 |
| 4,644,127 | 2/1987 | La Rocca | 427/600 |
| 4,859,493 | 8/1989 | Lemelson | 427/562 |
| 5,035,364 | 7/1991 | Escallon | 241/5 |
| 5,158,804 | 10/1992 | Alkan et al. | 427/600 |
| 5,176,938 | 1/1993 | Wallstén et al. | 427/447 |
| 5,198,026 | 3/1993 | Nishimura et al. | 427/455 |
| 5,228,910 | 7/1993 | Joyce et al. | 106/450 |
| 5,234,723 | 8/1993 | Babacz | 427/491 |
| 5,340,618 | 8/1994 | Tanisaki et al. | 427/488 |
| 5,489,449 | 2/1996 | Umeya et al. | 427/453 |
| 5,552,125 | 9/1996 | Chamblee et al. | 427/453 |

*Primary Examiner*—Marianne Padgett
*Attorney, Agent, or Firm*—James A. Costello; Sudhir G. Deshmukh

[57] ABSTRACT

A method for treating the surface of substantially each deagglomerated particle of an array of easily agglomerated particles by contacting deagglomerated particles with a plasma-activated gas species and modifying the surfaces of the deagglomerated particles to aid subsequent incorporation of the particles into a matrix composition; the module for deagglomerating and dispersing the particles into the plasma-activated gas; the apparatus that comprises the deagglomeration module (322) and a reaction chamber (20) in which the particles are treated with the plasma-activated gas; the method for deagglomerating particles that may reagglomerate after plasma treatment; and a color composition containing plasma-treated pigment particles.

17 Claims, 11 Drawing Sheets

FIG. 9

TREATMENT OF DEAGGLOMERATED PARTICLES WITH PLASMA-ACTIVATED SPECIES

This application is a §371 of PCT/US97/01629 filed on Feb. 6, 1997, which is a continuation-in-part of Ser. No. 08/595,970 filed on Feb. 6, 1996 now abandoned.

BACKGROUND OF THE INVENTION

This invention concerns the atmospheric and subatmospheric treatment of particulate materials by a plasma-activated gas species to modify the particle surfaces. U.S. Pat. No. 4,478,643 discloses a pigment treated with a low temperature plasma wherein the pigment is maintained in a commercially available plasma asher for a time that is excessive and will cause pigment degradation. U.S. Pat. No. 5,234,723 discloses a process for treating particulates with a plasma-activated species at subatmospheric pressure by dropping a particulate through said treatment zone homogeneously. U.S. Pat. No. 5,176,938 discloses a process for treating particulates by passing them through a plasma flame. U.S. Pat. No. 5,340,618 discloses a method of treating a powder with an atmospheric pressure plasma by dispersing the powder within the reaction chamber using what appears to be a fluidized bed arrangement without addressing the problem of deagglomeration.

The process of the instant invention avoids the harsh treatment conditions of the '643 and '938 processes and the agglomeration of the '723 and '618 processes.

The organic particles contemplated for surface modification by the method of this invention have varying affinities for clumping together as agglomerates and/or aggregates by virtue of physical and/or chemical attractions among particles. It is believed that plasma activated species essentially will only interact with, and thereby treat, the surfaces of the clumps. When clumps or agglomerates are treated, only primary particles that are at or near the surface of the clump will be treated by the plasma activated species. It therefore follows that the larger the size of the clump, the smaller the proportion of the primary particles within the clump that can be treated by the gas species and hence the less effective the treatment process will be.

There is almost nothing in the prior art to guide one in the successful implementation of a modification process for materials that readily agglomerate. In this regard, it has now been discovered that successful surface modification of particles requires an integrated process for deagglomerating clumps of particles and treating them while in their deagglomerated state and before they have an opportunity to reagglomerate. It has been found necessary, for readily clumping particulate materials, to treat the particles while they are in a subdivided state, in order to achieve effective treatment at commercial production rates. The degree to which the clumps are subdivided must be no greater than a certain multiple of the mean dimension of the primary particles. The required conditions for the successful modification of normally clumping particulate organic materials by the process of this invention are as described in more detail hereafter.

SUMMARY OF THE INVENTION

This invention concerns a method for treating the surface of particulate materials that exhibit irreversible degradation when heated above a threshold temperature not exceeding about 500 degrees C. with at least one species of plasma-activated process gas in a treatment chamber that contains the plasma source or is downstream of the plasma source, comprising the steps of:

- i introducing activated process gas into the treatment chamber,
- ii deagglomerating the particles into fractions to expose at least a portion of the surface of substantially each fraction of deagglomerated particles,
- iii contacting the deagglomerated particle fractions with the activated process gas in the reaction chamber before reagglomeration can occur to any substantial degree,
- iv modifying at least a portion of the surface of substantially each deagglomerated particle fraction with the activated process gas, and
- v controlling the temperature of the deagglomerated particle fractions so they do not thermally degrade.

This invention also concerns a method for grinding agglomerated pigment particles comprising the steps:

- i disposing to the grinding mechanism agglomerated particles that have been surface-modified by the method of this invention, and
- ii grinding said particles to effect deagglomeration, whereby the deagglomeration is effected at less than about 85% of the time it would take under identical conditions to deagglomerate pigment particles not surface-modified by the method of this invention.

This process will effect size reduction of the agglomerated particles. Wet-milling and high-shear mixing can also be employed in deagglomeration.

This invention also concerns a color composition (color concentrate, millbase, or finished paint) comprising surface-treated pigment particles, the composition having the following properties:

- i viscosity less than one-half that of a like composition comprising untreated particles of the same pigment,
- ii improved tinting strength at least 2% above that of a like composition comprising untreated particles of the same pigment, and
- iii increased pigment to binder ratio at least about 5% above that of a like composition comprising untreated pigment.

It has been found in treating a normally difficult-to-treat pigment, whose color is readily degraded, such as red pigment, that surface treatment can be accomplished by the process of this invention causing a color shift on the L*a*b* color scale of only ±0.3, a color shift less than is observable by the average human observer. As used herein color measurements are expressed in the L*a*b* color space according to ASTM Standards on Color and Appearance Measurement, First Edition, American Society for Testing and Materials (ASTM), Philadelphia. 1984.

This invention also concerns an improvement in an apparatus for treating particles at atmospheric or subatmospheric pressure comprising a reaction or treatment zone in a reaction chamber having particle inlet and outlet means, a plasma-generating source either inside or outside the reaction zone, and a particle storage hopper that cooperates with the inlet. The improvement comprises:

- i a particle-filled storage hopper designed to operate at a pressure above that of the reaction chamber;
- ii a module located between the particle storage hopper and the inlet that cooperates with both, the module comprising means for controlling a feed rate of the particles, for deagglomerating the particles, and for introducing deagglomerated particles into the reaction zone, and iii means for maintaining the deagglomerated particles at a temperature below that at which they degrade.

The apparatus described above will comprise a deagglomeration module that deagglomerates and disperses the particles into the reaction zone characterized by these features:

i a mass flow mechanism that moves particles from the hopper to the reaction chamber inlet at a controllable rate of particle mass per unit time, and ii a mechanism for introducing the particles into the reaction zone in a manner to effect particle deagglomeration and dispersion.

It is preferred that the deagglomeration module comprise a mixing chamber for mixing particulates and a carrier gas, mechanical stirring means, an ultrasonic horn energized by an ultrasonic transducer and an outlet orifice, wherein the pressure in the mixing chamber is maintained above the pressure in the reaction chamber, and wherein the region immediately adjacent the outlet orifice is ultrasonically agitated with sufficient energy to prevent plugging of the orifice by the particles and to facilitate deagglomeration of the particles, the carrier gas then carrying the deagglomerated particles into the reaction chamber. Also contemplated are other means including mechanical deagglomeration and dispersal of the particles with or without the aid of a carrier gas.

This invention also concerns an improvement in an apparatus for treating particles at subatmospheric pressure comprising a reaction or treatment zone in a reaction chamber having particle inlet and outlet means, a plasma-generating source outside the reaction zone, and a particle storage hopper that cooperates with the inlet. The improvement comprises:

i a particle-filled storage hopper;

ii means for controlling a feed rate of the particles from the storage hopper;

iii a module located between the particle storage hopper and the inlet that cooperates with both, the module comprising means for controlling feed rate of the particles and for deagglomerating the particles, and introducing deagglomerated particles into the reaction zone; and iv means for maintaining the reaction zone at a low plasma potential.

This invention also concerns an improvement in an apparatus for treating particles at atmospheric pressure comprising a reaction or treatment zone in a reaction chamber having particle inlet and outlet means, a plasma-generating source either inside or outside of the reaction zone, and a particle storage hopper that cooperates with the inlet. The improvement comprises:

i a particle-filled storage hopper designed to operate at above atmospheric pressure;

ii a module located between the particle storage hopper and the inlet that cooperates with both, the module comprising means for controlling a feed rate of the particles, for deagglomerating the particles, and for introducing the deagglomerated particles into the reaction zone. and iii means for maintaining the deagglomerated particles at a temperature below the temperature at which they degrade.

BRIEF DESCRIPTION OF THE DRAWINGS

FIG. 9 is an elevational view, partially in section and partially diagrammatic, of a fifth embodiment of the apparatus of the present invention.

DETAILS OF THE INVENTION PLASMA GENERATION

Figure 1:
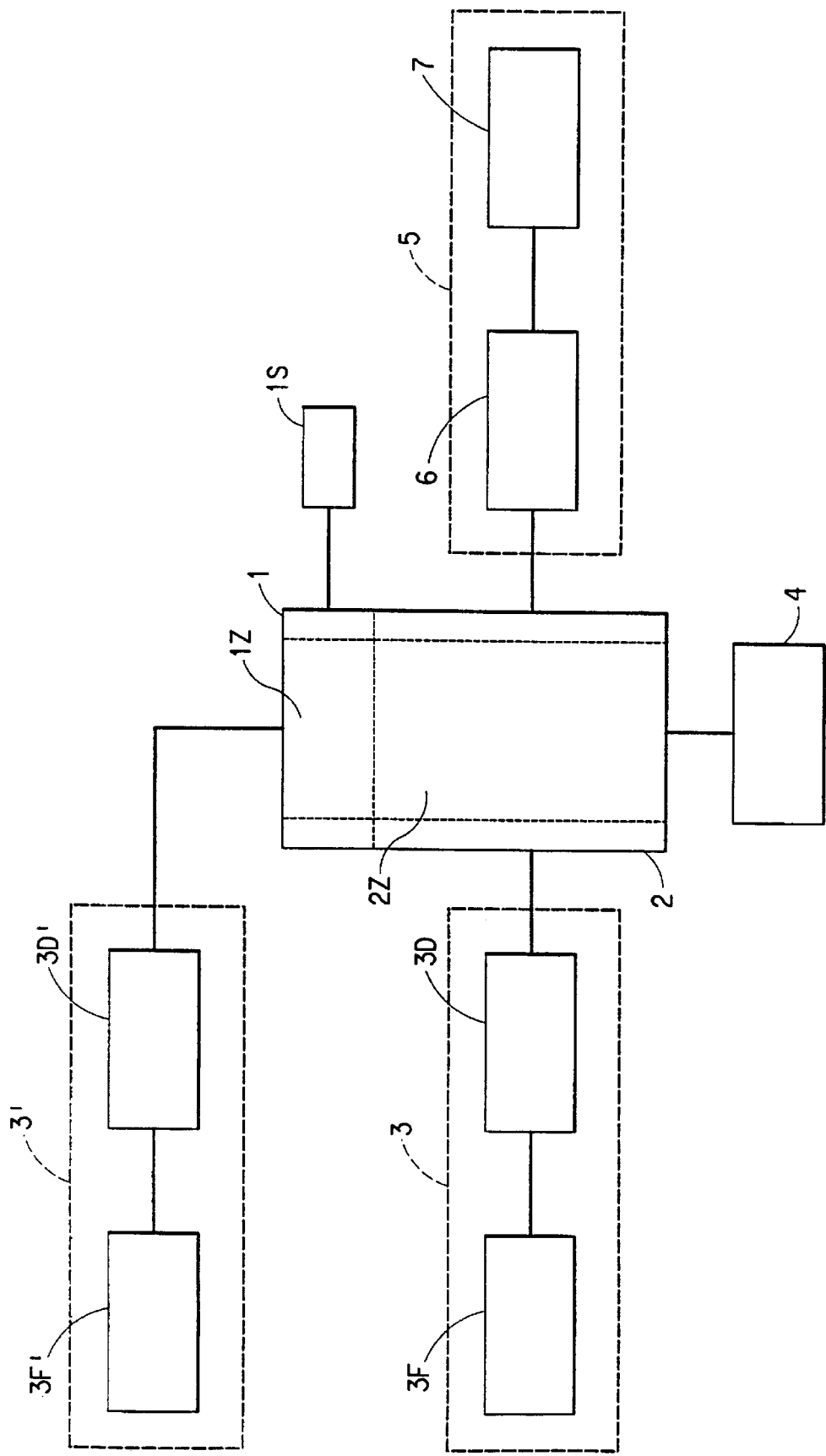
FIG. 1 is a diagrammatic block diagram, of the apparatus of the present invention.

One skilled in the art will appreciate the numerous ways in which plasma-activated species contemplated herein may be generated. This invention is not limited to any particular plasma activation source. On the contrary, any source can be employed whose use is consistent with the description provided herein. For instance, low pressure plasmas may be energized by microwave radiation or by radiofrequency radiation; atmospheric pressure plasmas may be produced by silent discharge or by glow discharge. Typical discharge techniques are known as "dielectric barrier discharge", "flow stabilized corona", "non-equilibrium microdischarge", and the like. An atmospheric pressure glow discharge is achieved by the introduction of an inert gas into the source. Depending on what is to be accomplished and the nature of the particulate material to be treated, one or another of these activation sources may be preferred. Alternative energy sources, such as a DC arc, including the so-called "cascade DC arc", can also be employed in low pressure activation sources.

Since many particulate materials are susceptible to damage when heated above their threshold temperature, either the treatment zone can be maintained separate from the plasma creation region, and located further downstream, or an activated gas species whose temperature is compatible with the particulate materials, generated by a nonequilibrium atmospheric pressure plasma-source, can be used.

Particle temperatures and the reactive species concentrations, in the treatment zone can be adjusted by controlling the ratio of the electrical power to process gas flow rate, or by individually controlling the electrical power, the gas pressure in the plasma creation region and in the treatment zone, the process and carrier gas flow rates, the particulate feed rates, and the like.

DESCRIPTION OF TERMS

The term "primary particle" employed herein will have a size determined by the manufacturing process (such as crystallization). The desired primary particle size is typically determined by the specific end use for which the particle has been made. For instance, it will be produced to have a certain optical, mechanical, or chemical property. The minor size dimension of a primary particle will be about 0.01 micron to 10 microns. "Particle(s)" and "particulate(s)" are particles substantially larger than primary particle size due to aggregation and/or agglomeration following the initial manufacturing step of the primary particles.

Materials whose primary particle size is smaller than about 1 micron are especially susceptible to agglomeration. Typically, particulate organic materials are available in the form of particulates that are substantially larger than the primary particle size. These particulates consist of primary particles bound together by aggregation and/or agglomeration.

While many particles are approximately spherical in shape, i.e., all three dimensions are about the same, some particles are in the form of fibrils or flakes. In fibrils, one dimension is significantly larger than the other two. In flakes, two dimensions are significantly larger than the other one. In the case of irregularly shaped primary particles, what is contemplated herein are those particles whose ratio of the arithmetic mean of the three dimensions to the smallest dimension is no greater than about twenty five.

"Aggregates," as the term is used herein, consist of primary particles that are strongly bound together with chemical bonds at their points of contact. Aggregates are typically relatively difficult to break apart into primary particles due to the strength of the bonds. Aggregates can contain tens to hundreds of primary particles resulting in particulate materials with effective particle size(s) from about two to ten times larger than the size of the primary particles.

The term "agglomerate(s)," depending on the context, includes primary particles that are associated together, including aggregates, due to interparticle forces such as van der Waals forces, electrostatics, and capillary action. Agglomerates consist of primary particles and possibly aggregates that are weakly bound together at their points of contact. These agglomerates can contain many thousands or millions of primary particles (and possibly many thousands of aggregates), resulting in particulate materials with effective particle size(s) many times larger than the size of primary particles. Generally, agglomerates are larger than aggregates although this is not always the case. The larger the agglomerate, the smaller the proportion of primary particle surfaces that can be treated by the plasma activated gas species and hence the less effective the treatment process will be.

The term "deagglomerated particulate (particle) fraction (s)," or simply "fraction(s)" means particles that result when agglomerated particles are deagglomerated in accordance with the immediately following description. Deagglomerated fractions are generally significantly smaller than the size of the parent agglomerated particles from which the fractions originate, and can range all the way down to primary particle size, depending upon the amount of mechanical energy imparted to the agglomerated particles.

The term deagglomerated fractions is not intended to include primary particles which have been broken or fractured into smaller pieces. More specifically, the process of this invention is intended to treat particle fractions that are no more than about thirty times the average size dimension (arithmetic average or mean) of the primary particle. More preferably, the fraction is no more than twenty times the average size dimension of the primary particle. Most preferably, the fraction is no more than ten times the average size dimension of the primary particle.

By "substantial degree of reagglomeration" is meant that the average particle size has increased to above thirty times the average mean dimension of the primary particle. Particles that exceed about thirty times the average size of the primary particle have been found too large under normal circumstances to be successfully treated by plasma-activated species. The process of this invention excludes the treatment of such overlarge particle clumps.

By "degradation" is meant an undesirable change in one or more properties of the particulate material including discoloration and/or chemical change in which one compound breaks down.

By "threshold temperature" is meant that temperature at which degradation begins. A typical example, found in the thermal gravimetric analysis art, is the term onset temperature of decomposition, i. e., the temperature at which the degradation begins, measured by loss of weight (other than loss of solvent) as a function of temperature. This temperature is defined by the intersection of the tangent of the weight percent versus temperature curve before degradation with the tangent of weight percent versus temperature curve during degradation. As contemplated herein, there are two basic modes of treatment of particles: within the zone or region in which the plasma is created, intrasource treatment; and outside the zone or region in which the plasma is created, downstream treatment.

By "plasma potential" is meant the apparent voltage that would be measured by a high impedance voltmeter if one terminal of the voltmeter is connected to the wall of the chamber and the other terminal is placed in the interior volume of the chamber.

In the process of this invention, process gas is introduced into a plasma generating zone, where electrical energy is supplied, creating plasma-activated species. This activated gas is then utilized to treat deagglomerated particles, intrasource, or is designed to flow out of this intrasource region to treat such particles downstream.

By "downstream" is meant that the particles to be treated do not pass through the plasma creation chamber (or zone or region), but are introduced into a treatment chamber located farther down the path of the already activated process gas exiting the plasma generation zone. Introduction of particles downstream is typically through an opening or port separate from that through which the plasma-activated species is introduced.

As used herein, by "organic compounds" is meant carbon-containing compounds except: binary compounds (such as the carbon oxides, carbides, carbon disulfide, etc.); ternary compounds (such as the metallic cyanides, metallic carbonyls, phosgene, carbonyl sulfide, etc.); and the metallic carbonates (such as calcium carbonate and sodium carbonate), and includes compounds that one skilled in the art would know from The Condensed Chemical Dictionary, 10th edition, revised by Gessner Hawley.

By "introducing activated process gas into the treatment chamber" is meant either introducing already activated process gas into the treatment chamber or introducing process gas into the treatment chamber and then activating it within the treatment chamber.

The method of this invention can be operated either at substantially atmospheric pressure, which will be termed "atmospheric" or below atmospheric pressure, which will be termed "subatmospheric". The method can be operated at atmospheric pressure either within the plasma source (intrasource), or in a treatment chamber downstream of the plasma source (downstream). The method can be operated at subatmospheric pressure in a treatment chamber downstream of the plasma source. With respect to both atmospheric and subatmospheric operation of the process of this invention, the particles are deagglomerated while being pneumatically conveyed and dispersed into the treatment zone to maximize the exposure of the surface of each deagglomerated particle to the plasma-activated gas species.

Both the active species concentration and the degree of particle deagglomeration and dispersion are controlled to obtain optimum modification of the particle surface by the activated gas species within the reaction zone of the reactor assembly. The present invention preferably uses conventional reactor materials, which are chemically compatible with the product being treated. If necessary, materials especially resistant to corrosion and wear from the process chemicals can be employed. If needed, liners or surface layers such as fluoropolymers, quartz, ceramics, silicon oxide, silicon nitride, silicon carbide or synthetic diamond can be employed. The advantages of the present invention, include improvement in the dispersion rheology of particles, particularly pigment particles, and offers several potentially valuable benefits including: reduced pigment grind time in manufacturing, lower volatile organic compounds (VOC) in tint, and paints having both higher tinting strength and pigment to binder ratio.

Subatmospheric pressure operation will generally be conducted downstream of the plasma source. With respect to the particle treatment apparatus preferred for use at subatmospheric pressures, the particles that have been surface-treated are typically removed from their storage volume in the bottom of the reaction chamber by an airlock device comprising a double valve arrangement with a storage chamber between the valves, the valves being located serially between the storage volume of the reaction zone and the outlet opening, the apparatus designed to maintain low pressure in the reaction zone when either or both valves are closed, and closure of the valve adjacent to the reaction zone while the valve adjacent to the outlet opening is opened to remove treated particles. During subatmospheric operation of the process of this invention, the plasma-activated reactive gas flows downstream into the separate pigment treatment zone. The plasma potential, specific enthalpy, and heavy species temperature in the treatment zone are controlled at levels that enhance rheology and/or tinting strength, while maintaining critical pigment properties such as color at acceptable levels. Control of the treatment environment can be further facilitated by controlling pressure to below 1 Torr and reducing the temperature of the plasma activated species by use of diffuser plates which also serve to keep the pigment separated from the high temperature plasma creation zone adjacent to the microwave source.

Although a diffuser plate assembly is preferred to disperse the plasma-activated species and to prevent thermal degradation of the particles in the treatment zone, other equivalent mechanisms are contemplated, such as a serpentine gas passage or the addition of a quench gas to quench the plasma. In a preferred embodiment, particles exiting a conventional volumetric solids feeder enter a deagglomeration module which comprises, a mixing chamber, a motor driven agitator, a means for injecting a controlled amount of carrier gas through a porous plate, an ultrasonically activated orifice (e.g.,. Branson Vacuum horn #109-017-215), driven by an ultrasonic transducer, (e.g., Dukane transducer # 41C27), powered by a power supply (e.g., Dukane power supply # 20 A 1000). Upon entering the mixing chamber, the particles are partially deagglomerated by the agitator and mixed with carrier gas. As the particles become aerated by the carrier gas flowing through the porous plate they are drawn toward the lower pressure area of the orifice.

The ultrasonic horn to which the orifice is mounted generates acoustic waves which are transmitted via the gas into the chamber. This acoustic energy combined with the mechanical motion of the horn is of sufficient intensity to deaggiomerate the particles. As the particles move closer to the orifice, the intensity of this acoustic energy increases and an increasing degree of deagglomeration is effected. The strongest deagglomerating force induced by the ultrasound is present in the vicinity of the orifice and while readily agglomerated particles would normally tend to build-up and obscure the orifice, the combination of the ultrasonically-induced mechanical motion of the orifice and the large deagglomerating acoustic forces in the vicinity of the orifice deter such a tendency. The particles are then drawn through the ultrasonically vibrated orifice and passed through the center of the ultrasonic horn which is connected to a transfer line leading to an input port on the reactor. As the particles are accelerated from the higher pressure regime in the mixing chamber to the lower pressure regime in the reactor, gas entrained in the particles at higher pressures will provide additional deagglomerating forces as will collisions at the higher speeds. To function in this mode, this embodiment requires: (a) that the pressure drop between the particles feed hopper and the mixing chamber be minimal; (b) that there is a sufficient pressure drop between the mixing chamber and the reactor to accommodate the conveyance of the solid by the motion of the injected gas: and (c) that the pressure in the mixing chamber be sufficient so that the ultrasonic horn is efficient in conveying acoustic energy into the mixing chamber (i.e., >500 Torr).

To control the relative pressures between the two regimes: (a) a controlled amount of gas is injected into the mixing chamber so as to match the amount fed through the orifice and (b) the orifice is appropriately sized. The orifice is typically circular in shape with a diameter in the range of about 0.2 mm (0.008 inches) to 3.0 mm (0.120 inches), preferably in the range of about 0.5 mm to 2.0 mm. The size of the orifice is selected according to the rate at which the particles are fed into the treatment apparatus and according to the gas pressure utilized.

The combination of orifice size and relative pressure between the mixing chamber and the reaction chamber constitute a "mass flow mechanism" that moves particles from the hopper to the reaction chamber inlet at a controllable rate of particle mass per unit time. The combination of motor-driven agitator, ultrasonic energizing of the region adjacent the orifice and the pressure experienced by the gas-particle mixture between the mixing and reaction chambers constitute a mechanism for introducing the particles into the reaction zone in a manner to effect particle deagglomeration and dispersion.

It is a feature of all embodiments of this invention that deagglomeration can be accomplished by one or a combination of mechanical means, ultrasonic vibration, electrostatic means, and the throughput of carrier gas. The preferred process, where the particles being treated are pigment particles, will create an effective residence time of the particles with the activated species of less than about 2 seconds. A primary benefit of the process of this invention is that particulate behavior can be modified to effect desirable changes in surface properties without causing irreversible degradation. It is important in the successful practice of this invention to treat as many of the primary particles contained within the agglomerates as possible. It is equally important to control the temperature of the particles so that the threshold temperature of the particular material being treated will not be exceeded. Each material to be treated has a threshold temperature that can be predetermined, either from the literature, e.g., from its reported Tg value, or can be determined by experimentation. Of special interest is the treatment method in which the particles are pigment particles.

When the particles to be treated are pigment particles, it is preferred to maintain the temperature of the particles below that at which a pigment color shift will occur. Pigment particles are treated by the process of this invention to functionalize their surfaces to complement the pigment dispersant thus enhancing the long term stability of the resulting color compositions. Additional properties of the resulting color composition affected by surface treatment include enhanced rheology, minimization of color drift, improved tint strength and hiding, as well as more efficient dispersibility in the coating binder.

The process of this invention can be operated as a batch or continuous process. In a continuous process the particles can be treated in a continuous manner and removed from the reaction chamber in a discontinuous manner or in a continuous manner. Yet another feature is dispersing the deagglomerated particles in the reaction chamber in the presence of a carrier gas. The carrier gas can be the same or different from the process gas. The process gas is the gas from which the activated species are produced by the activating plasma. It is contemplated that more than one carrier gas and/or more than one process gas can be employed. It is not always necessary to employ an inert gas in the operation of this process, although this can be done if desired. Use of an inert gas, such as helium, is preferred in the downstream atmospheric pressure embodiment. Contemplated process and carrier gases will depend on the nature of the particulates being treated, on the method of treatment (atmospheric or subatmospheric), and the surface modification desired. As discussed in more detail hereafter, process gases can be selected from oxygen, nitrogen, water vapor, hydrogen peroxide, carbon dioxide, ammonia, ozone, carbon monoxide, trimethylsilane, tetraetoxysilane (TEOS), hexamethyldisiloxane, ethylene diamine, maleic anhydride, arylamine, acetylene, methane, ethylene oxide, hydrogen, styrene, air, sulfur dioxide, sulfonyl precursors, phosphonyl precursors, alcohols and includes inert gases such as helium and argon. Carrier gases can be selected from the named process gases. Under certain process conditions, when activation of the process gas produces short-lived activated species, particularly where atmospheric pressure treatment is effected in a downstream embodiment, it is preferred to employ an inert gas, particularly helium, to assure availability of activated species in the reaction zone. In addition, it is cost-effective and thus desirable to recycle the process and/or carrier gases as will be discussed in more detail hereafter.

Representative features of the apparatus and method(s) of the low pressure embodiment of this invention include the use of diffuser plates to disperse the activated gas species, reduce the presence of charged species and lower the maximum energy density in the reaction chamber. The use of diffuser plates assures that the plasma potential does not exceed about 1 volt. Contemplated system pressure will typically not exceed about 10 Torrs with preferred pressures being no more than about 1 Torr.

FIG. 1 is a diagrammatic block diagram, of the apparatus of the present invention. All embodiments comprise similar elements, but arranged in different ways. The apparatus comprises a plasma source 1, having an associated power supply, 1S, and a reactor assembly, 2. In a first embodiment, a feeder assembly, 3 comprising a feeder, 3F, and a deagglomeration module, 3D, introduces deagglomerated particles into a reaction zone, 2Z, of reactor, 2. In a second embodiment, a feeder assembly, 3', comprising a feeder, 3F', and a deagglomeration module, 3D', introduce deagglomerated particles into the plasma creation zone, 1Z, which in this embodiment is common with the reaction zone, 2Z. A collection assembly, 4, collects the treated particles. A gas removal assembly, 5, comprising a gas/particle separator, 6, and a gas moving device, 7, removes the gas and residual gas-entrained particles from the reactor assembly, 2. The gas moving device, 7, can take the form of a vacuum pump or a fan unit.

Figure 2:
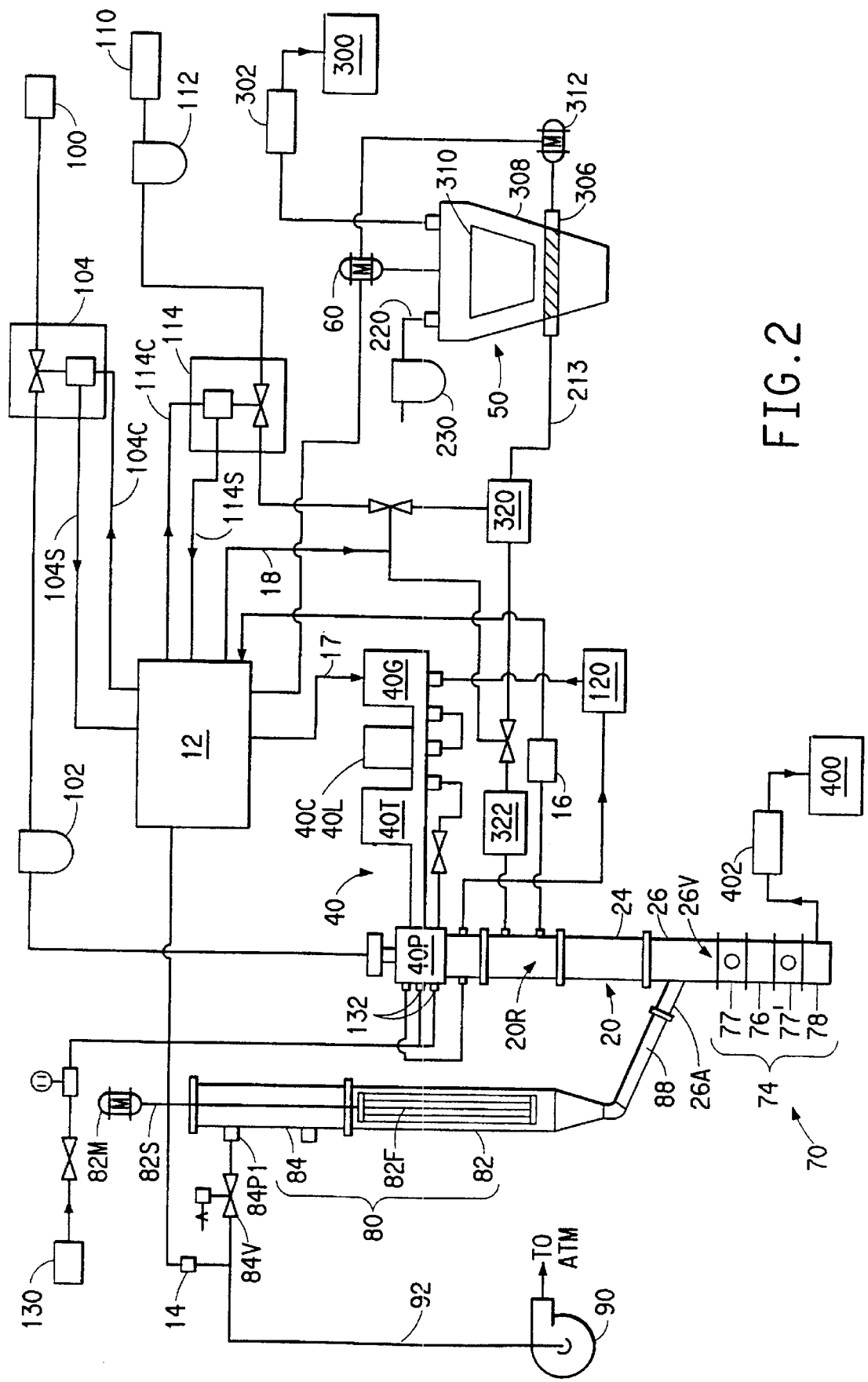
FIG. 2 is an elevational view, partly in section, of a first embodiment of the apparatus of the present invention.

FIG. 2 depicts a first embodiment of the apparatus of this invention, comprising a system control unit, 12, a reactor assembly, 20, a microwave plasma generator, 40, a particle feeder assembly, 50, a particle collection assembly, 70, a particle separator assembly, 80, a vacuum pump assembly, 90, a source of process gas, 100, associated filter, 102, associated mass flow controller, 104, a source of carrier gas, 110, associated filter, 112, associated mass flow controller, 114, a source of cooling water, 120, and a source of pressurized air, 130. The system control unit, 12, which can be any conventional control unit such as a programmable controller, monitors process conditions via pressure transducers, 14, 16, mass flow controller flow signal outputs 104S, 114S, and controls process parameters via control signals, 17, 18, 104C, and 114C. The reactor assembly, 20, is a generally cylindrical structure comprising a plurality of flanged tube sections, 22, 24, and a Y-shaped flanged section, 26. The Y-shaped section, 26, comprises an appendage, 26A, and a storage volume, 26V.

Figure 5:
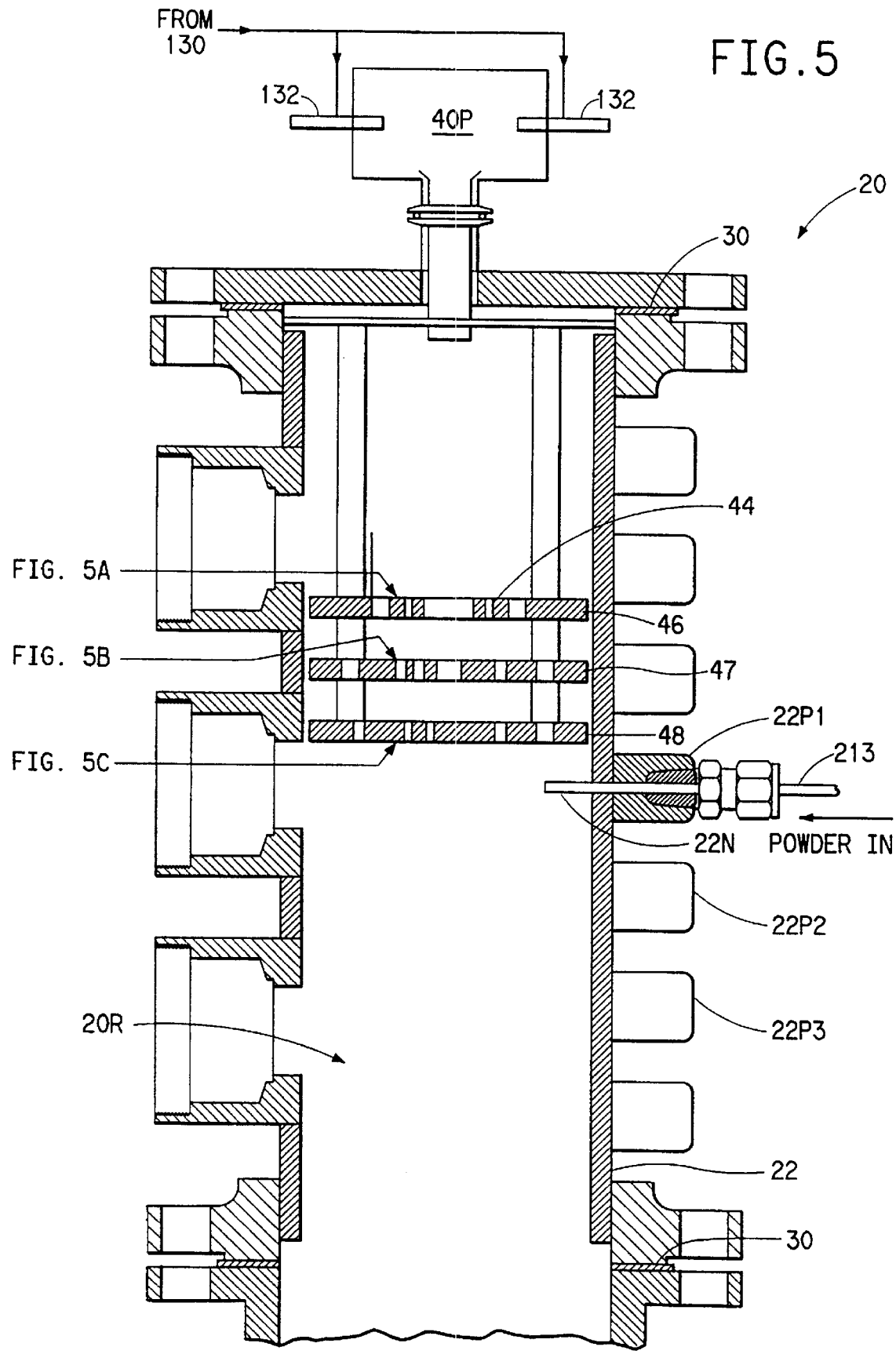
FIG. 5 is a sectional view of the reaction chamber of the reactor assembly, showing the hole patterns of the diffuser plates of the diffuser assembly.
Figure 6A:
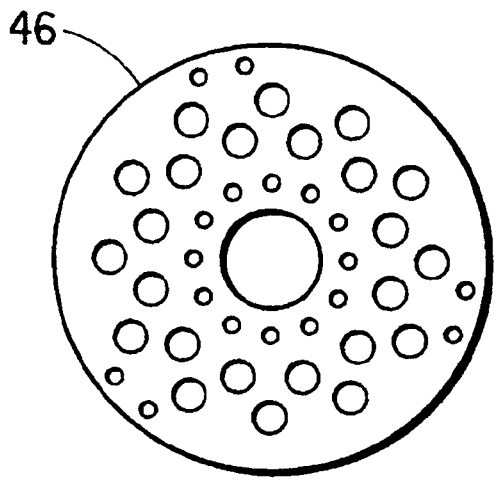
FIG. 6 is a top view of the diffuser plates.
Figure 6B:
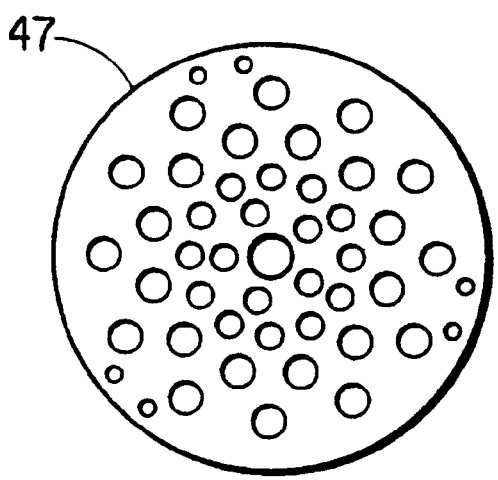
Figure 6C:
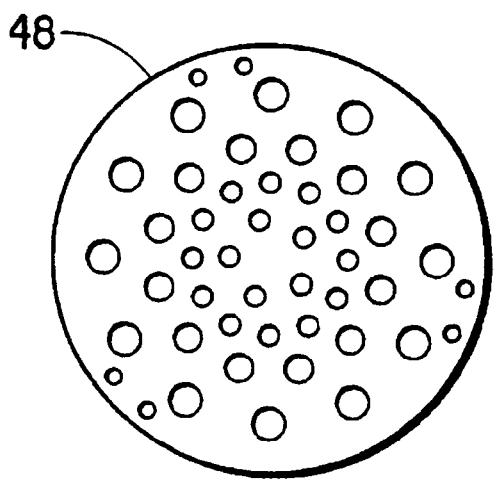

Suitable seals, 30, (best seen in FIG. 5) which can comprise gaskets or O-rings, are employed at all flange connections throughout the apparatus to render the apparatus vacuum tight when assembled. The microwave plasma generator, 40, is a commercially available assembly comprising a Model AX2115-2 microwave power generator, 40G, a Model AX3120 circulator, 40C, with a Model AX3030 dummy load, 40L, a Model AX3045 automated microwave tuner, 40T, and a Model AX7020 downstream plasma generator, 40P, all available from Applied Science and Technologies (ASTeX), Inc. of Woburn, Mass. One or more vortex coolers, 132, can be optionally used to cool the plasma generator. 40P. An optional diffuser assembly, such as shown in FIGS. 5 and 6, can be employed to reduce the temperature of and better distribute the process gas in the reaction zone, 20R, of reactor assembly, 20. The particle feeder assembly, 50, comprises a Model KW2MV-T35 screw feeder, 306, equipped with a 3.5 cubic foot conical hopper, 308, fitted with a bridge breaker (rotary stirrer), 310, from K-TRON North America of Pitman, N.J. Stirrer assembly, 310, is driven by an external drive motor assembly, 60. The screw feeder mechanism, 306, driven by motor, 312, can be used to convey partially agglomerated particles to diffusion manifold, 320, and deagglomerating/dispersing mechanism, 322, which feeds reactor, 20. The particle collection assembly, 70, comprises an airlock collection assembly, 74, which comprises chambers, 76, 78 and valves, 77, 77', and facilitates removal of treated product from the reactor assembly, 20, into a receiving container, 400, by conveying means, 402, without interruption of the treatment process. The particle separator assembly, 80, comprises a cylindrical filter housing, 82, which holds a suitable filter, 82F, such as a cartridge or bag filter, and a flanged pipe assembly, 84, having a side port, 84P1. A filter shaking mechanism, 82S, driven by motor, 82M, can be used to periodically shake accumulated particles from filter, 82F. A pressure sensor, 14, is connected to the port, 84P1, to monitor the pressure on the vacuum pump side of the filter in the filter housing. Pipe assembly, 88, connects the separator assembly to the appendage, 26A, of Y-shaped section, 26, of reactor assembly, 20.

The vacuum pump assembly, 90, can comprise any suitable commercially available vacuum pump, such as a Model E2M40 in combination with a Model EH1200 mechanical booster pump from Edwards High Vacuum International of Wilmington, Mass. and is connected to particle separator assembly, 80, by a suitable pipe, 92, typically with commercially available vacuum apparatus flange connections. Valve, 84V, can be used to isolate the separator assembly, 80, from the vacuum pump, 90, as needed. The apparatus of FIG. 2 is useful to operate a continuous process. Particulates are conveyed from an open container, 300, via pneumatic (or other) means, 302, to the feeder assembly, 50. Optional vent, 220, and filter, 230, can be used when pneumatic conveying means are used to insure that particulates do not escape into the atmosphere, The particles form a vacuum seal allowing feeding of particles in continuous process mode. The rotary stirrer, 310, driven by motor, 60, is provided in the hopper to avoid loss of vacuum seal via flow induced channels opening to the atmosphere. Feed from the feeder assembly, 50, to reactor inlet includes mass flow control via a transfer line, 213, and diffusion manifold, 320, wherein carrier gas from mass flow controller, 114, is mixed with the particulate (s) forming a fluidized mixture which can be more finely divided via a deagglomerating/dispersion mechanism. 322, at the reactor inlet. Carrier gas utilization is minimized to lower vacuum/filter requirements. The mixture of carrier gas and particles enter the reaction chamber at high velocity. The expansion of the carrier gas as the mixture enters the reaction chamber further disperses the particles. Some deagglomerated particles impact the wall of the reactor assembly and their momentum causes them to break apart and form a cloud of highly dispersed particles in the volume of the reaction zone.

After treatment, product falls to the bottom of the reactor into the collection assembly, 74, for subsequent removal from the reactor assembly vessel to a receiving container, 400, at atmospheric pressure. The chamber, 78, is periodically emptied while chamber, 76, continues to receive treated product, thus effectively removing treated particles from the reaction chamber continuously. The particulate-containing gas stream which flows toward the vacuum pump is then filtered by filter assembly, 80, to remove pigment particles which are returned internally to the collection assembly upon filter cleaning, by shaker, 82S, to maximize yield of product. The upward angle of the appendage, 26A, of the Y-shaped section, 26, is preferably inclined at an angle between 45 and 60 degrees above the horizontal to minimize the amount of residual particles which reach the filter assembly.

It is known in the art that radical generation in the activated gas species in a downstream plasma generator can be optimized by cooling the quartz tube within the plasma generator and by insuring the quartz tube has an ultra-smooth surface finish. The quartz tube is typically cooled using vortex tubes such as Model 10604-H from ITW Vortec of Cincinnati, Ohio and can be periodically smoothed using a hydrogen fluoride (HF) etch. See, for example, Thissell, Process and Control of Selective Area Laser Deposition from Methane and Hydrogen, Ph.D. Dissertation, University of Texas at Austin, December 1994.

Figure 3:
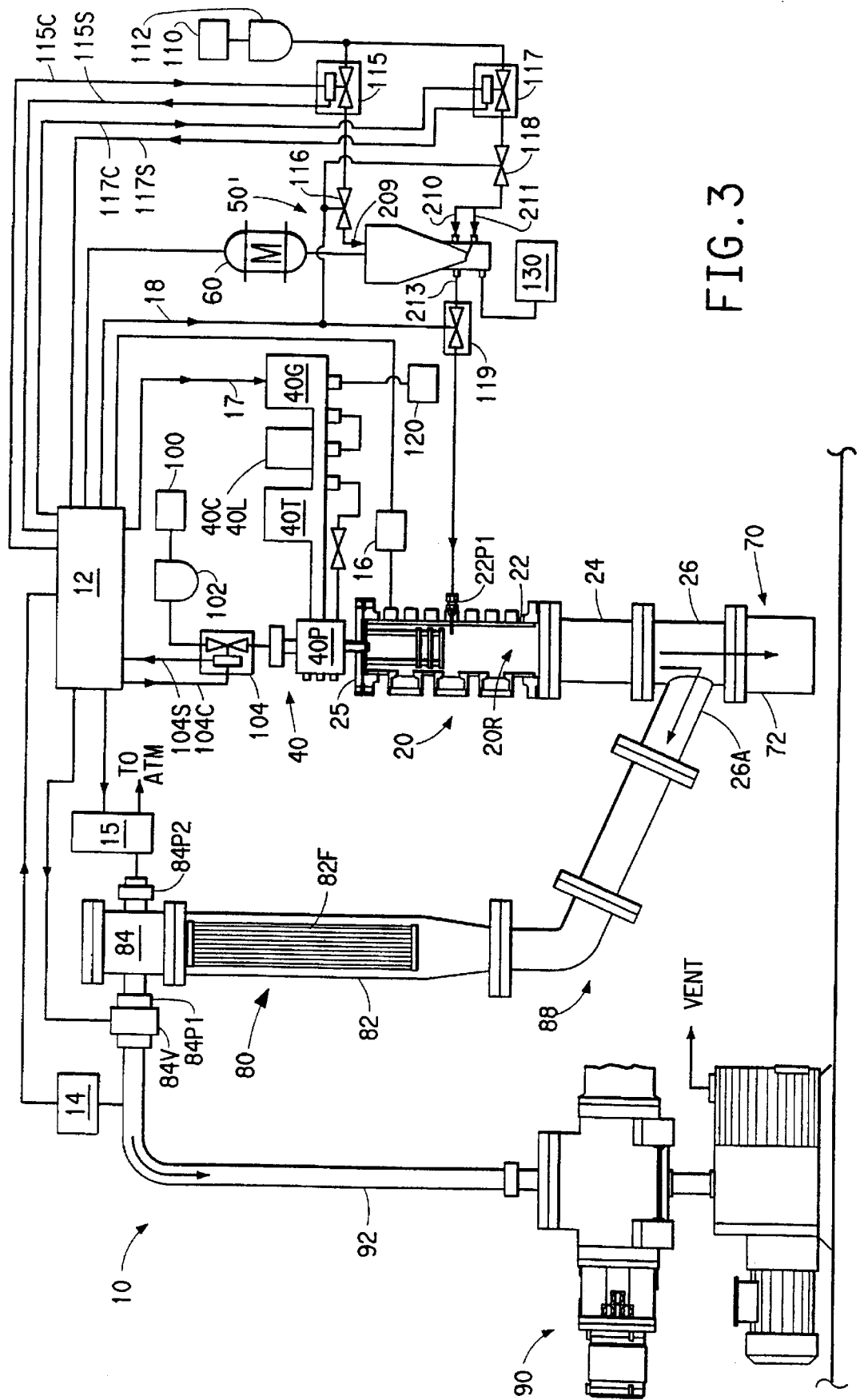
FIG. 3 is an elevational view, partly in section, of a second embodiment of the apparatus of the present invention.

FIG. 3 depicts a second embodiment of the apparatus of this invention comprising a system control unit, 12, a reactor assembly, 20, a microwave plasma generator, 40, a particle feeder assembly, 50', a particle collection assembly, 70, a particle separator assembly, 80, and a vacuum pump assembly, 90, a source of process gas, 100, associated filter, 102, associated mass flow controller, 104, a source of carrier gas, 110, associated filter, 112, associated mass flow controllers, 115, 117, a source of cooling water, 120, and a source of pressurized air, 130.

The system control unit, 12, which can be implemented by any conventional control unit such as a programmable controller, monitors process conditions via transducers, 14, 16, and controls process parameters via control signals, 17, 18, 104C, 115C, 117C. The reactor assembly, 20, similar to that of FIG. 2, is a generally cylindrical structure comprising a plurality of flanged pipe and tube sections, 22, 24, a Y-shaped flanged section, 26, and end cap, 25. The pipe section, 22, has a plurality of threaded side ports, 22P1, 22P2, 22P3; see FIG. 5. The microwave plasma generator, 40, is a commercially available assembly such as described in conjunction with FIG. 2. An optional diffuser assembly can be used, as previously discussed. The particle feeder assembly 50', best seen in FIG. 4, comprises a particle feed hopper from Metco Inc. of Westbury, N.Y. which has been modified.

The particle collection assembly, 70, comprises a collection container, 72. Collection container, 72, typically flanged for vacuum-tight attachment to the reactor assembly, is used for a batch mode of operation, requiring the reactor to be returned to atmospheric pressure while the collection container is removed and emptied of treated product.

The particle separator assembly, 80, comprises a cylindrical filter housing, 82, which holds a suitable cartridge filter, 82F, such as an expanded PTFE membrane cartridge, sold under the trade name GoreTex Light Pulse filter cartridge available from W. L. Gore & Associates, Inc. of Elkton, Md., and a flanged pipe assembly, 84, having side ports, 84P1 and 84P2. A pressure sensor, 14, is mounted on one side of port, 84P1, to monitor the pressure in the filter housing. A valve, 15, one side of which is open to the atmosphere, can be connected to port, 84P2, and is typically used to momentarily back pulse the filter cartridge, 82F, to remove accumulated particles. Pipe assembly, 88, connects the separator assembly to Y-shaped pipe section, 26, of reactor assembly, 20. The vacuum pump assembly, 90, can comprise any suitable commercially available vacuum pump, such as described in conjunction with FIG. 2 and is connected to particle separator assembly, 80, by a suitable pipe, 92, typically with commercially available vacuum apparatus flange connections.

Figure 4:
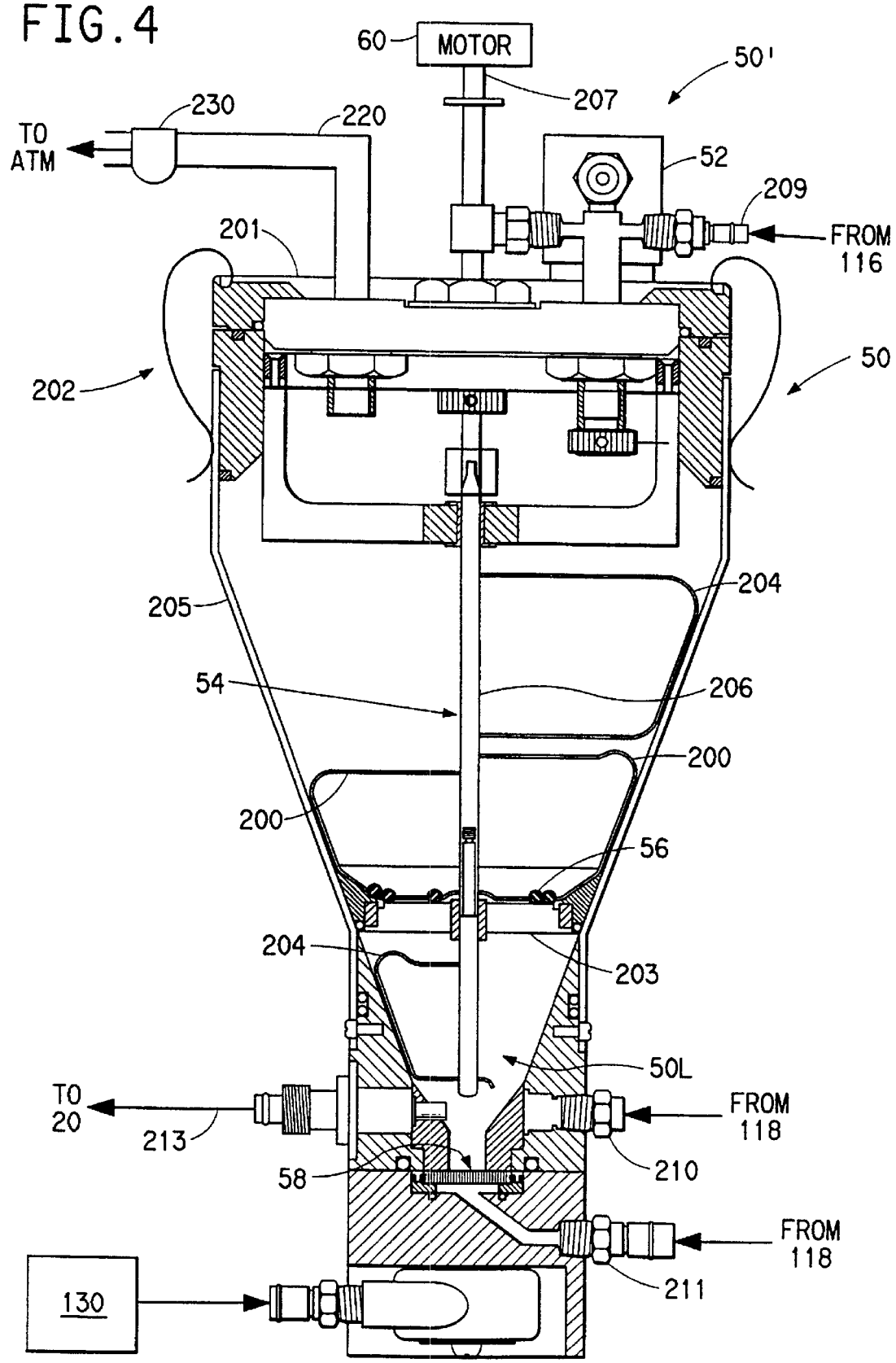
FIG. 4 is an enlarged sectional view of the particle feeder assembly apparatus, corresponding to the second embodiment.

FIG. 4 depicts the particle feeder assembly, 50', modified to relocate the gas inlet assembly, 52, to remove the powder pickup tube and reduce the area of the powder aeration plate, 58, to incorporate the addition of a stirrer assembly, 54, one or more ceramic balls, 56, and a particle screen assembly, 203. Stirrer assembly, 54, is driven by an external drive motor assembly, 60. Mass flow controller, 115, supplies carrier gas to inlet port, 209, through valve, 116. Mass flow controller, 117, distributes carrier gas to inlet ports, 210, 211, of feeder assembly, 50' through valve, 118. Particles are loaded into the reservoir, 205, onto screen assembly, 203, through hopper-top, 201, which is secured by clamp assembly, 202. Particles sit on screen assembly, 203. The agitator assembly comprises one or more bridge breakers, 204, one or more bridge breaker sweepers, 200, screen, 203, agitator balls, 56, and drive shaft assembly, 206. The agitator assembly is connected to motor, 60, by a flexible drive shaft, 207. Upon initiation of the feed cycle, the following events occur simultaneously. Valves 116, 118, 119 (see FIG. 3), open. Valve, 116, fed by mass flow controller, 115, in the carrier gas line opens allowing carrier gas to enter feeder assembly, 50, via port, 209. Valve, 118, fed by mass flow controller, 117, in the carrier gas line opens allowing carrier gas to enter feeder assembly, 50, via aeration ports, 210, and 211. Bridge breakers, 200, 204, move particles away from and down along the interior walls of the hopper reservoir, 205. The sweepers, 200, move across the screen assembly, 203, interacting with the balls, 56, breaking and sieving the agglomerated particles. The balls, 56, also move vertically, rolling over the sweepers, 200, and colliding with the screen, 203, clearing particles from the screen and increasing the sieving action. Partially deagglomerated particles sieve through the screen where fluidizing action of the gas entering at 211 causes further deagglomeration. Valve, 119, between hopper and reactor, opens to allow the gas and particles in the area, 50L, to be pneumatically dispersed into the reactor. Flow control is further aided by pneumatically vibrating the hopper assembly, powered by pressurized air, 130.

Particles are deagglomerated and dispersed by simultaneous action of the following: mechanical stirring with ceramic balls and sieving through screen assembly; controlling the pressure difference between the upper particle reservoir, 205, and the lower region, 50L; providing sufficient carrier gas through ports, 210 and 211, to provide sufficient mechanical energy to fluidize particles in the lower portion, 50L, of hopper and transfer particles into the reaction chamber without inhibiting overall reduced pressure in the treatment system. Pressure difference between reactor and 50L region will cause fluidized and partially deagglomerated particles to enter transfer line, 213, where they are pneumatically conveyed and accelerated toward the reactor. This rapid acceleration causes high speed collisions of the particles among themselves and with transfer line walls and the carrier gas to effect further deagglomeration. Another deagglomeration/dispersion mechanism, 322, as in FIG. 2, can be employed if desired. Particles enter reactor, 20, through nozzle assembly, 22N (FIG. 5), while moving at high velocity leading to collision with the opposite reactor wall. Other types of dispersing targets can be employed as will be obvious to one skilled in the art. The result is a dispersion rapidly flowing throughout the reactor volume.

FIG. 5 depicts the reaction chamber area including the inlet for the deagglomerated particulates which are dispersed under system pressure to effect any residual deagglomeration that may be necessary. Also shown is one assembly, 44, of diffuser plates to distribute the activated gas species and to attentuate plasma potential and protect the particles from the most energetic plasma region. Any equivalent diffuser mechanism, 44, can be employed which accomplishes this effect. There can be as few as one plate in any orientation located between the plasma and the bulk of the particles being introduced into the reaction chamber. The plates can be of any slope and design pattern to effect this result.

In FIG. 6, the three diffuser plates referenced in FIG. 5 are shown. The diffuser plates are commonly constructed from quartz, which is a material benign to the process and beneficial to the flow of the desired radical-rich stream of activated gas species. The top diffuser plate, 46 (FIG. 6A), is oriented below the opening of the ASTeX downstream plasma generator at a sufficient distance to allow the plasma stream to cool to prevent melting the quartz plate. The center of the top diffuser plate, 46, is removed to allow the high velocity, high energy gas species to enter a series of diffuser plates with offset openings or paths for the gas species to increase the number of collisions between the plasma constituents and the plasma-compatible diffuser plates during their migration toward the particles to be treated. The increased collisions of the gas species induce recombination of the ions with the electrons, leaving a radical-rich stream for interaction with the particles to be treated. Quartz is typically used to construct the offset paths for the diffuser plates to maintain the radical-rich stream, but other materials benign to the process and compatible with the activated process gas can be used. In addition, the holes cut into the bottom diffuser plate, 48 (FIG. 6C), are progressively smaller in diameter for the center line of the structure than those in the upper diffuser plates, 46 and 47 (FIG. 6B), to maximize the number of collisions between ions and electrons to optimally create a radical-rich stream and to minimize the possibility of backstreaming of particulates being treated.

FIG. 7 depicts a simplified view of a third embodiment of the apparatus of this invention, similar in many ways to the first and second embodiments. This embodiment utilizes a particle feeder assembly, 50', which incorporates a deagglomeration module, 500, a particle collection assembly, 70', a particle separator assembly, 80', and a vacuum pump assembly, 90. For simplicity of illustration, some elements common to the earlier embodiments are not shown. The reactor assembly, 20, which is essentially the same as that shown in FIG. 2, is shown in a simplified form. The particle feeder assembly, 50', is similar to that shown in FIG. 2. The screw feeder mechanism, 306, driven by motor, 312, conveys agglomerated particles to the deagglomeration module, 500, which feeds reactor, 20. The particle collection assembly, 70', comprises a chamber, 476, a valve 477, a screw feeder mechanism, 456, driven by motor, 462, and a pneumatic conveying assembly, 402, which facilitates removal of treated product from the chamber, 476, into a receiving container, 400, without interruption of the treatment process. The pneumatic conveying assembly, 402, comprises a source of conveying gas, 404, such as nitrogen, a first valve, 406, a second valve, 408, a vacuum pump, 410, a filter assembly, 412, line, 414, a transfer line, 416, a third valve, 418, a filter assembly, 420, a fourth valve, 422, and a fifth valve, 424. The particle separator assembly, 80', is similar to separator assembly 80, with the addition of a cyclone separator, 481, and associated collection container, 481C. The cyclone separator, 481, removes most of the particles from the particulate-containing gas stream which flows toward the vacuum pump, 90. This reduces the number of particles loading the filter, 82F, and thus minimizes the pressure drop across the filter, 82F. The relatively small quantity of pigment particles collected in container, 481C, can be manually removed or conveyed by mechanical means to the receiving container, 400. One or more optional diffusion plates, as indicated by reference numeral, 548, similar to diffusion plates, 46, 47, 48, described in conjunction with FIG. 5, may be used to prevent the particulates from entering the plasma source, 40.

The apparatus of FIG. 7 is useful to operate a continuous process. Particulates are conveyed from an open container, 300, to the feeder assembly. 50', as described in conjunction with FIG. 1. Feed from the conical hopper, 308, to the deagglomeration module, 500, is controlled by a screw feeder, 306. The deagglomeration module, 500, receives the agglomerated particles, mixes them with carrier gas, passes them through the ultrasonically agitated orifice, 514, (best seen in FIG. 11) where the particles are deagglomerated and then fed to the reactor, 20. Carrier gas utilization is controlled by the size of the orifice, 514, to minimize the vacuum pump/filter requirements while maintaining the particles in a deagglomerated state. The mixture of carrier gas and particles enter the reaction chamber, 20, at high velocity. The expansion of the carrier gas as the mixture enters the reaction chamber disperses the particles and forms a cloud of highly dispersed particles in the volume of the reaction zone. Some deagglomerated particles impact the wall of the reactor assembly and their momentum causes them to break apart to a greater degree. After treatment, product falls to the bottom volume, 20V, of the reactor, 20, and into chamber, 476, through valve, 477, which is normally kept open. The chamber, 476, is periodically emptied into the receiving container, 400, at atmospheric pressure. Valve, 477, is closed and chamber, 476, is emptied while the bottom volume, 20V, of the reactor, 20, continues to receive treated product. Valve, 477, is then opened, thus effectively removing treated particles from the reaction chamber continuously.

When the level of the particles in the chamber, 476, has reached a predetermined level an emptying cycle is initiated. At the start of a cycle, just after valve, 477, has closed, valves 406, 418 are in a closed state. Valve, 408, which was open to permit vacuum pump, 410, to evacuate chamber, 476, to the same low pressure level of the reaction chamber, 20, is then closed. Valves 406, 418, are opened and motor, 462, is energized to cause screw feeder, 456, to feed particles to the output port of chamber, 476, to transfer line, 416. Gas source, 404, causes conveying gas to flow through line, 414, into chamber, 476, and causes the particulate-containing gas stream to flow through 416, toward the receiving container, 400. Valve, 424, is open, allowing excess gas to vent through filter assembly, 420, to the atmosphere. When chamber, 476, is empty, valves 406 and 418, are closed and valve, 408, is opened, permitting vacuum pump, 410, to again evacuate chamber, 476, to the same low pressure as reactor, 20. Valve, 477, is then opened. Periodically, filter, 420, can be cleaned of accumulated particles by back pulsing the filter with a short burst of gas by opening valve, 422, for a short period of time.

Figure 7:
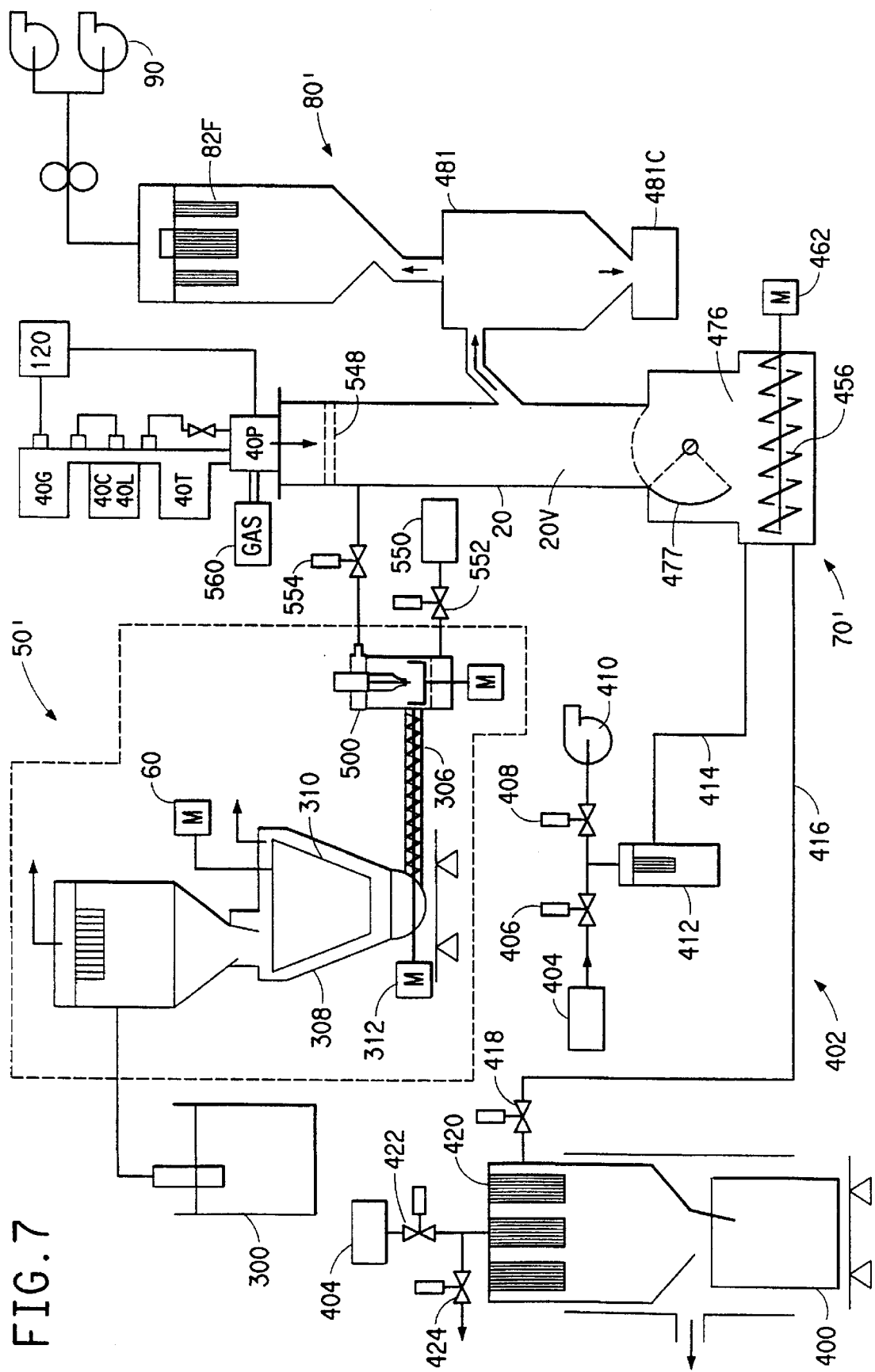
FIG. 7 is an elevational view, partially in section and partially diagrammatic, of a third embodiment of the apparatus of the present invention.

The apparatus of FIG. 7 can be utilized to modify thermally sensitive deagglomerated particle surfaces, such as organic powder surfaces in a downstream embodiment of the process of this invention using a low pressure plasma source. Both the generation of activated gas species with a plasma source and the deagglomeration of the particles require use of substantial quantities of gas while simultaneously maintaining a sufficiently low pressure. At relatively modest treatment rates, the low pressure requirement can readily be accommodated. At higher treatment rates, higher capacity more expensive vacuum systems are required. It would be desirable to eliminate the need for the vacuum system by modifying surfaces of deagglomerated organic particles at atmospheric pressure. Typical equilibrium or thermal plasmas created at atmospheric pressure exhibit high temperatures which can thermally degrade the organic particles. Inherently low temperature activated gas species generated by nonequilibrium atmospheric pressure plasmas sources have been used in the prior art to modify surfaces of temperature sensitive organic materials without thermal degradation. Readily agglomerating organic particles can be treated with such nonequilibrium atmospheric plasma sources when the powders are first deagglomerated to increase the surface area exposed to the activated species. This process can be accomplished by either of two alternate embodiments: by treating the deagglomerated particles downstream from the plasma source employing the apparatus depicted in FIG. 8, or passing the deagglomerated particles directly through the source, employing the apparatus of FIG. 9.

Figure 8:
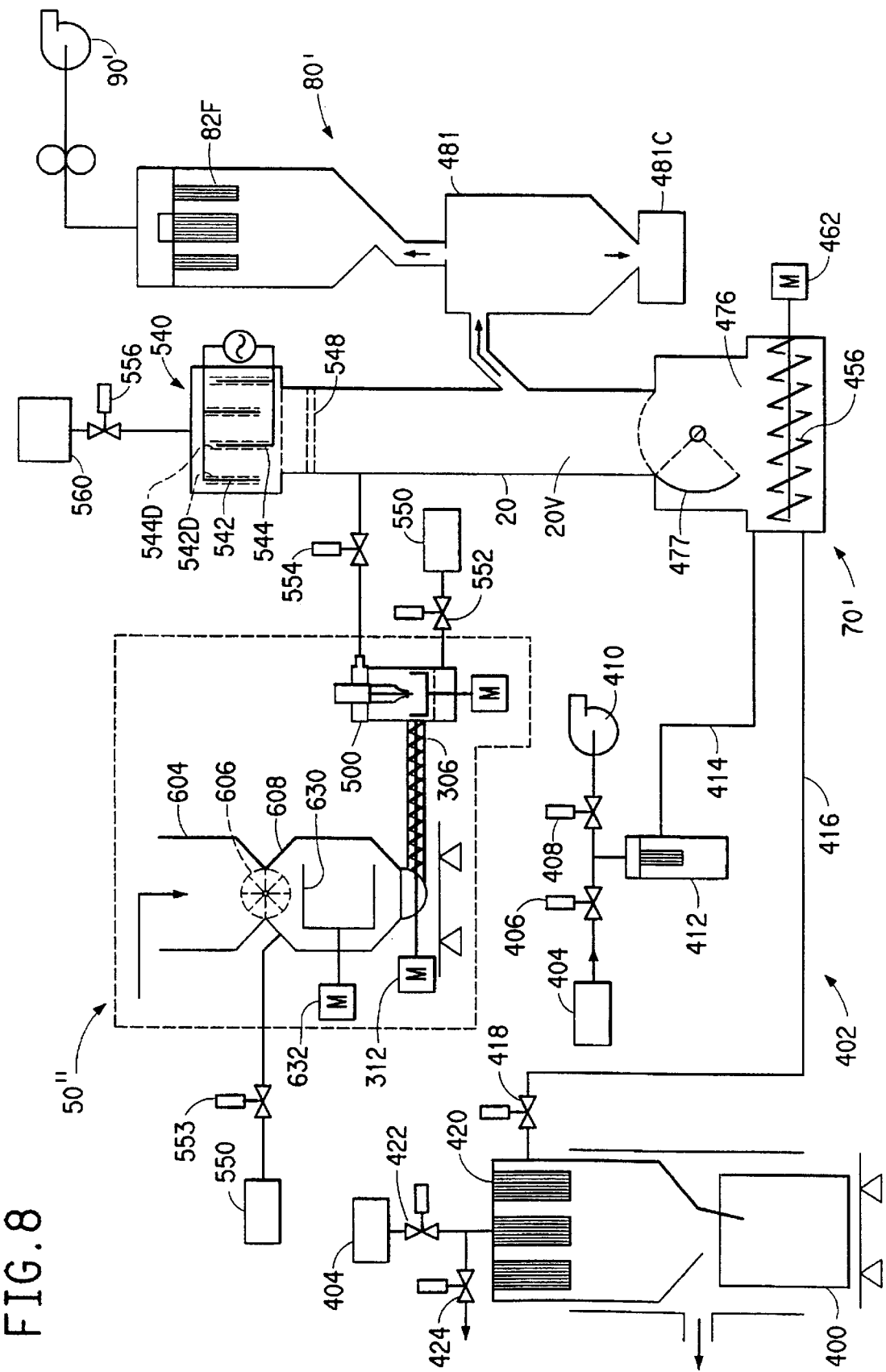
FIG. 8 is an elevational view, partially in section and partially diagrammatic, of a fourth embodiment of the apparatus of the present invention.

FIG. 8 depicts an atmospheric pressure process using a dielectric barrier discharge source, 540, similar to that known in the prior art, to create activated species for treating particulates in a reaction chamber, 20, downstream from the plasma source. The plasma source, 540, may be comprised of a power supply, 540S, electrodes, 542 and 544, which are covered or coated with dielectric layers, 542D, 544D. In accordance with this embodiment, the particulates are first deagglomerated by feeder assembly, 50", which incorporates the deagglomeration module 500, described in conjunction with FIG. 7. Feeder assembly, 50", comprises a bin, 604, a rotary valve, 606, which feeds particulates from the bin, 604, into a hopper, 608. Rotary valve, 606, permits the chamber, 608, to be maintained at up to two atmospheres of pressure. Gas from a source, 550, being supplied to deagglomeration module, 500, permeates the particulate material, which only partially fills the screw feeder, 306, to pressurize the hopper, 608. If desired, process gas can be supplied from source, 550, through valve, 553, directly to hopper, 608, to maintain hopper, 608, at the same pressure as deagglomeration module, 500. A mixer, 630, which can take any convenient form, is provided to insure a steady flow of particles to the screw feeder, 306. In this embodiment which operates at atmospheric pressure, the vacuum pump, 90, may be replaced with a exhaust fan, 90'.

An optional diffusion plate, 548, similar to diffusion plate, 48, described in conjunction with FIG. 5, can be used to prevent the particulates from entering the plasma source, 540. A source, 560, of either a single process gas (when long lifetime activated species are generated) or a gas mixture (when short lifetime activated species are generated) can be used, as previously discussed. In the downstream approach the plasma gas is activated by passing it through a nonequilibrium low temperature plasma source, such as a dielectric barrier discharge, thus creating plasma-activated species capable of modifying the surface of deagglomerated organic particles without irreversible thermal degradation of the particles. In this embodiment, plasma-activated species created in the source are utilized downstream in a separate reaction zone. For long-lived species, a single gas can be fed to the plasma source for creation of activated species. Ozone, an example of a species that is stable at atmospheric pressure near room temperature, can be created by disassociating molecular oxygen via silent discharge in a dielectric barrier discharge plasma source. When activation of a particular process gas produces short lifetime activated species, a mixture of gases can be used to assure the presence of activated species in the downstream reaction zone. Many plasma-activated species, like those arising from carbon dioxide ($CO_2$). have relatively short lifetimes at atmospheric pressure and will not survive long enough to be useful in the downstream embodiment. If diluted with a gas having a sufficiently high energy metastable state, such as helium, the process gas maintains sufficient activity to be useful in the downstream embodiment.

It is believed that the diluting gas reduces the probability of recombination collisions of the activated species. The metastable states of the diluting gas can release energy in the reaction zone thus creating additional activated species. As an example of the downstream embodiment, the surface of a red pigment, such as diketo-pyrrolopyrrole red (DPP red), can be modified at atmospheric pressure using a dielectric barrier discharge, by introducing either pure oxygen or a mixture of oxygen and helium or a mixture of $CO_2$ and helium into the plasma source. By using appropriate power and voltage to activate the plasma, an activated gas species of sufficiently low temperature can be introduced into the reaction chamber.

Deagglomerated DPP red pigment particles can be introduced into the reaction chamber and exposed to activated species. Surface modification without thermal degradation of the particles can occur prior to substantial reagglomeration of the particles. In this embodiment, the pigment can be kept out of the plasma-activation region by sufficient plasma gas flow rate and/or use of diffusion plates.

Figure 9:
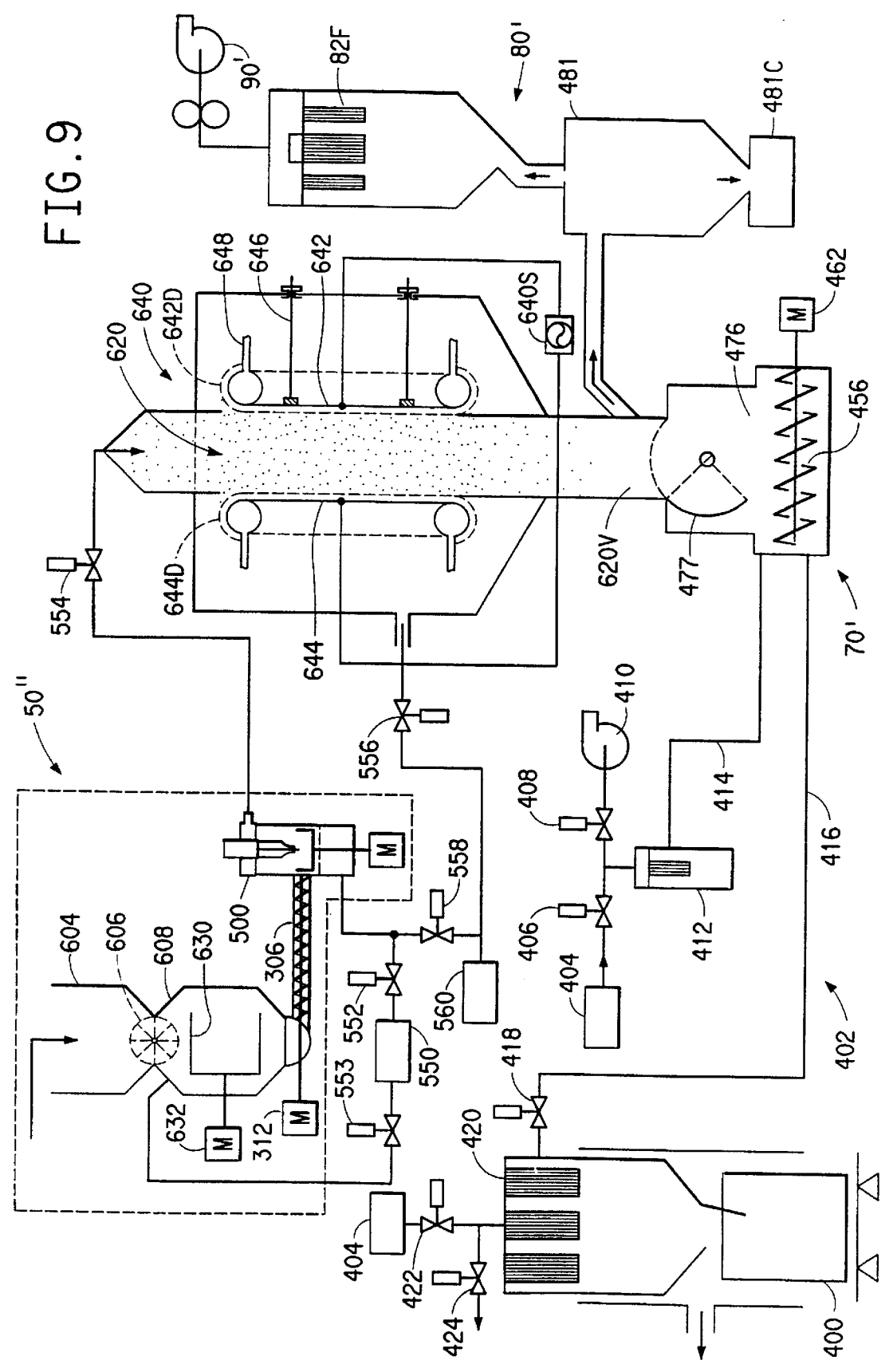

FIG. 9 depicts an atmospheric pressure process using a dielectric barrier discharge source, 640, similar to that known in the prior art, to create activated species for treating particulates in a reaction chamber, 620, within the plasma source, 640. In accordance with this intrasource embodiment, the particulates are first deagglomerated as described in conjunction with FIG. 8 by feeder assembly, 50", which incorporates the deagglomeration module, 500. In this embodiment a source, 550, of carrier gas feeds the deagglomeration module, 500, through valve, 552. If desired, process gas can be supplied from source, 550, through valve, 553, to hopper, 608, to maintain the hopper, 608, at the same pressure as deagglomeration module, 500. As shown, the carrier gas also serves as the process gas. Optionally, a source, 560, of additional process gas may be provided as shown. Valves, 556 and 558, may be provided to control flow of the additional process gas. The plasma source, 640, may be comprised of a power supply, 640S, electrodes, 642 and 644, which are covered or coated with dielectric layers 642D, 644D. An optional electrode positioning apparatus, 646, and an optional electrode cooling arrangement, 648, such water cooling, may be provided as shown. When the level of the particles in the bottom volume, 620V, of the reaction chamber, 620, has reached a predetermined level an emptying cycle can be initiated, as previously described in conjunction with FIG. 7.

In the typical intrasource embodiment of FIG. 9, it is also possible to pass the deagglomerated organic particles directly through a nonequilibrium low temperature plasma source to modify the surface of the particles with the activated species. In this embodiment, the deagglomerated particles pass through the plasma creation region thus exposing substantially increased surface area for modification. A dielectric barrier discharge is one type of nonequilibrium plasma source which can be employed for species activation. Since plasma gas is continuously activated within the source, species lifetimes are less important than with the downstream configuration. In the intrasource embodiment, either a single feed gas or a mixture of gases can be used. Blending the feed gas with increasing amounts of a gas such as helium causes the silent discharge within the plasma creation volume to be converted to an atmospheric pressure glow discharge. The surface modification of the particles occurs substantially completely within the plasma generation zone but can continue downstream if sufficient gas activity remains prior to substantial reagglomeration of the organic particles. Energetic electrons and photons generated within the plasma source can cause additional surface modifications of the particulate material.

In a typical intrasource embodiment, the surface of deagglomerated DPP red can be modified by passing the pigment particles through a dielectric barrier discharge source while simultaneously activating the plasma gas within the source with an appropriate level of power and voltage. The plasma gas can consist of only carrier gas or may consist of a mixture of the carrier gas and the additional process gas, either separately introduced or blended prior to introduction to the deagglomeration module. The deagglomerated particle surface is modified while in contact with activated gas species prior to substantial reagglomeration. Either a mixture of oxygen and helium or $CO_2$ or a mixture of $CO_2$ and helium can be used as the plasma gas. Due to the low temperature of the plasma gas, the particle surface is modified without thermal degradation. Other plasma gases can be selected depending on the specific particle type, surface modification required, and suitability of species lifetimes consistent with treating the deagglomerated organic particles entirely intrasource (short lifetime species) or continuing the treatment downstream of the source (long lifetime species).

Figure 10:
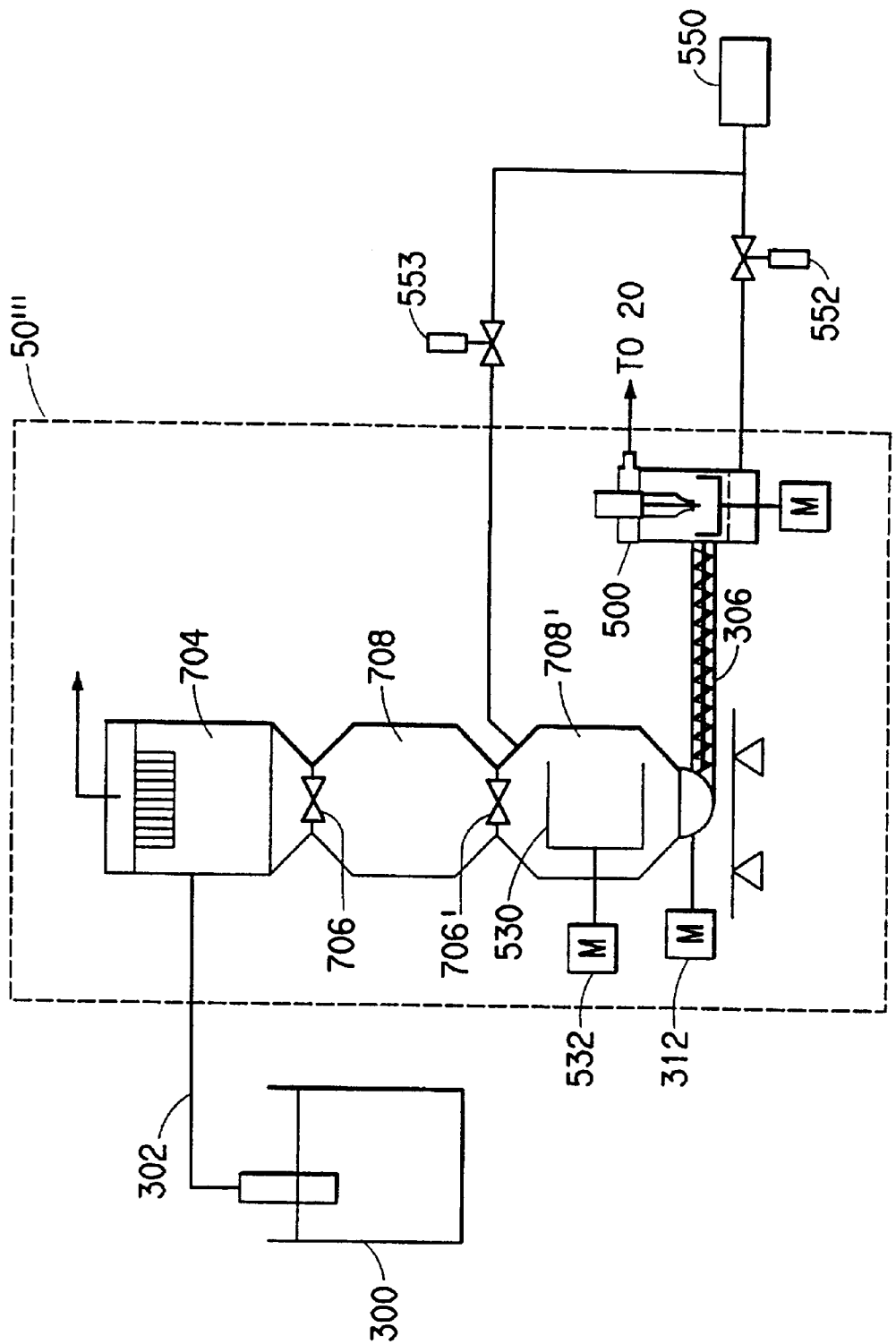
FIG. 10 is a sectional view of an alternate feeding assembly of the fourth or fifth embodiment, having a double airlock chamber configuration.

FIG. 10 illustrates an alternate feeder assembly, 50'", which is especially useful when feed pressures in excess of two atmospheres are required. It is believed that the rotary valve arrangement of FIG. 8 is unsuitable for such high feed pressures. This feeder assembly, 50'41 , comprises a two stage "airlock" arrangement comprising bin, 704, first valve, 706, first hopper, 708, second valve, 706', and second hopper, 708'. If desired, process gas can be supplied from source, 550, through valve, 553, directly to hopper, 708', to maintain hopper, 708', at the same pressure as deagglomeration module, 500.

Figure 11:
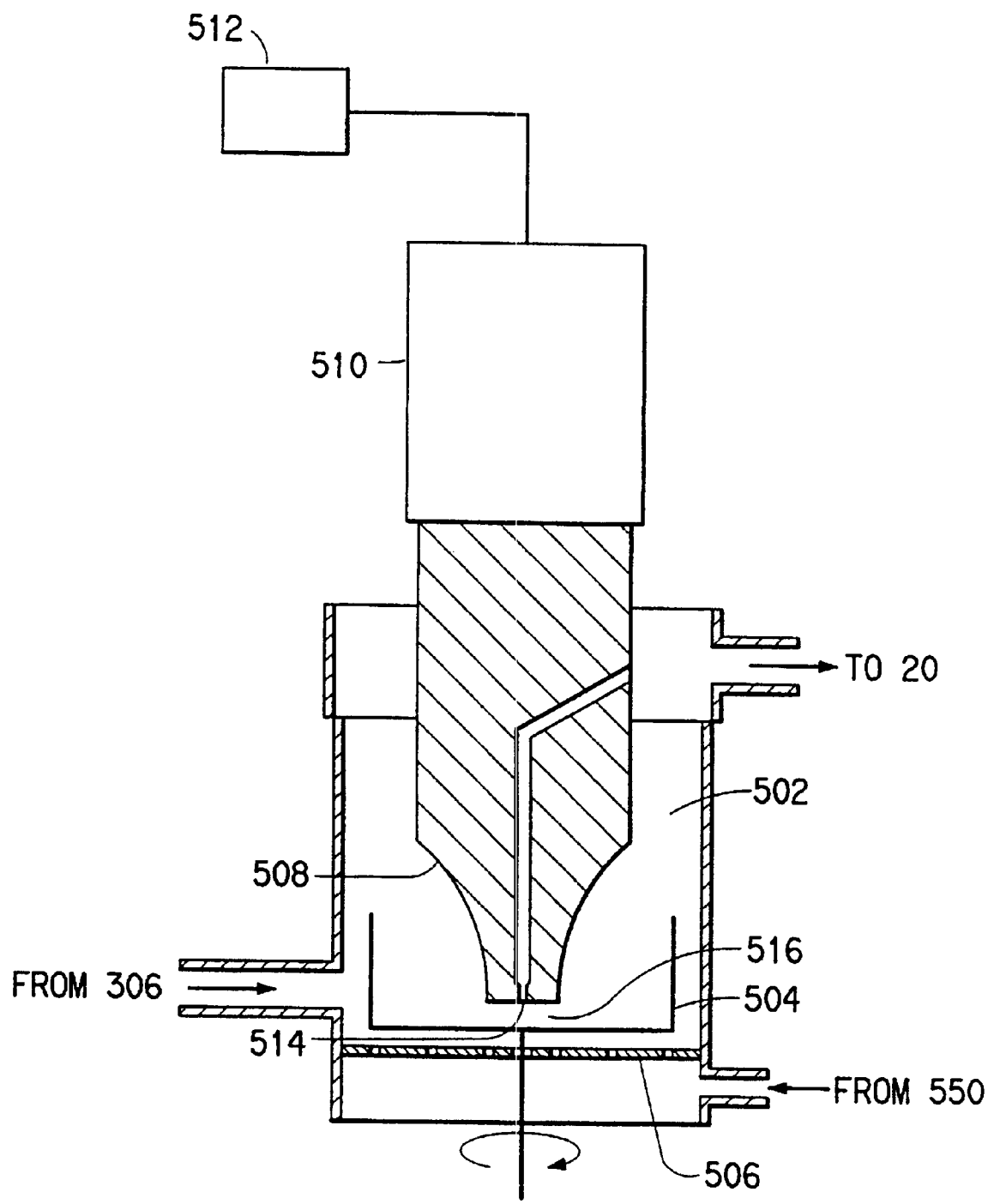
FIG. 11 is an enlarged sectional view of the deagglomeration module.

FIG. 11 illustrates the details of a typical embodiment of the deagglomeration module, 500. As shown in this figure, the deagglomeration module comprises a mixing chamber, 502, for mixing particulates from screw feeder, 306, and receiving carrier gas from a source, 550, mechanical stirring means, 504, a porous plate, 506, an ultrasonic horn, 508, energized by an ultrasonic transducer, 510, powered by a power supply, 512, and an outlet orifice, 514, wherein the pressure in the mixing chamber, 502, is maintained above the pressure in the reaction chamber, 20, (or 620 in FIG. 9), and wherein the region immediately adjacent the outlet orifice, 514, is ultrasonically agitated with sufficient energy to prevent plugging of the orifice by the particles and to facilitate deagglomeration of the particles, the pressure differential between chamber, 502, and the reaction chamber, 20, carries the deagglomerated particles into the reaction chamber. Particles that readily agglomerate tend to form bridges when attempts are made to feed the particles through small openings. In the present apparatus, the orifice is kept from clogging by the ultrasonic action both as mechanical motion of the orifice and the sound field near the orifice that keeps particles from sticking together. Deagglomeration of particles tends to occur near the orifice since high density of particles effectively absorbs the ultrasonic energy and blocks the energy from propagating any appreciable distance.

EXAMPLES

A simplified description of a batch process for treating pigment particles follows. A red organic pigment was treated by activated gas species in a batch process, using the apparatus of FIG. 3, at pigment flow rates up to 23 lbs/hr. A general outline of experimental procedure follows: $CO_2$ process gas was fed to an ASTeX microwave downstream source which created a low-pressure localized plasma in the high electromagnetic field region.

This highly excited plasma exits the high field region and begins recombination while flowing into the reactor. The red pigment was mixed with $CO_2$ for injection into the reactor volume. Pigment from a hopper was conveyed via carrier gas through a transfer-line into the reactor volume where the resulting pigment/gas mixture contacted the activated gas species thus modifying the pigment surface. Treated pigment product was separated from process gas and collected.

Example 1

A red pigment having Chemical Abstract No. 84632-65-5 (Ciba-Geigy) and the chemical formula, pyrrolo (3,4-C) pyrrol-1,4-dione 3,6-bis(4-chlorophenyl)-2,5-dihydro-(9Cl) and having a primary particle size of about 0.6 micron, was treated at subatmospheric pressure, using the batch process apparatus of FIG. 3, as follows to improve rheology, gloss, and tinting strength while maintaining color within an acceptable range of a paint composition incorporating this pigment.

Plasma-Activation Process Conditions:
System pressure, 1.9 Torr
Pigment Feed Rate, 1.2 lbs/hr
Carrier gas $CO_2$, 2 l/min
Process gas $CO_2$, 5 l/min
Microwave Power, 400W
Paint Composition:
1. Solvent blend, 35.84 wt. % (71.25% of xylene, 23.75% of n-butyl acetate and 5.0% of p-amyl acetate)
2. Acrylic polymer dispersant solution 43.83%
3. Pigment, 20.33%

Grinding Procedure After Surface Modification:

The above three ingredients were premixed for 15 minutes, then placed in a beaker grinder using sand media and ground at 350 rpm for 30 minutes, and the sand filtered to produce a color concentrate (dispersion). A Model RVT-DCP Brookfield viscometer was used to measure shear viscosity by using #3 spindle, at 1 rpm rotation speed. Gloss measurement was made using a BYK-Gardner, Inc., Haze-Gloss reflectometer at 20 degree and 60 degree angles. Color measurement was made using a MAC colorimeter, by DuPont Engineering Laboratory, Model Series 5 for measuring color at $L^*$ (brightness) $a^*$ (red-green). $b^*$ (blue-yellow). White dispersion for tinting strength (mixing with red dispersion): $TiO_2$ 16.04%, total solid 38.64%.

Product Testing:

Most commonly observed viscosity using the Brookfield viscometer:

|  | Untreated Pigment | Treated Pigment |
| --- | --- | --- |
| Poise | 180 | 20 |

Gloss was measured by taking sample of the color concentrate and putting it in a #5 drawdown bar from Gardner Co. to produce a film of about 10 microns thick which was air dried for about one hour before measuring the gloss. Gloss measurements:

| Observation Angle | Untreated | Treated |
| --- | --- | --- |
| 20 degrees | 7 | 20 |
| 60 degrees | 50 | 63 |

Color measurement:

Goal with this red pigment was not to alter the color position which was maintained ($L^*a^*b^*$) to within ±0.3 of the untreated sample. Masstone color batch was prepared as: 86% dispersion, 12% acrylic polymer dispersant solution, and 2% solvent.

This mixture was well mixed in a shaker before spray. Three aluminum panels were sprayed and baked at 125 F. for 30 minutes. Color was measured against a red standard by MAC calorimeter. The results were:

Plasma-Treated Sample $dL^*=0.61$, $da^*=-0.10$, $db^*=-0.94$
Untreated Sample $dL^*=0.50$, $da^*=+0.17$, $db^*=-1.01$ Tinting strength:

Goal was to reach the same shade using less of the pigment. The procedure follows. Take the color concentrate and mix with white dispersion. Mix concentrates for 10 minutes and spray on aluminum panel to hiding. Bake at 125 F. in air oven for 30 minutes. Measure color by MAC colorimeter. Delta(L) of treated sample ranged from 0.3 to 0.8 less than untreated. This represented an increase in tinting strength of about 5% or more.

Example 2

Perrindo maroon pigment (a transparent red) having the Chemical Abstract name anthradiisoquinoline-1,3,8,10(2H, 9H)-tetrone,2,9-dimethyl-(9Cl), having a primary particle size of about 0.2 micron, was treated at subatmospheric pressure using the batch process apparatus of FIG. 2.

Plasma-Activation Process Conditions:
System pressure, 2 Torr
Pigment Feed Rate, 1.7 lbs/hr
Carrier gas $CO_2$, 0.2 l/min
Process gas $CO_2$, 0.1 l/min
Microwave Power, 400W
Paint Composition:
1. Solvent blend, 39.66 wt. % (71.25% of xylene. 23.75% of n-butyl acetate and 5.0% of p-amyl acetate)
2. Acrylic polymer dispersant solution 46.43%
3. Pigment 13.91%

Property Measurement: Relative transparency and absolute haze of drawdown film on Mylar were measured using ColorQuest by HunterLab, Inc. Brookfield viscosity measurement for the dispersion used the same viscometer as used in Example 1. The spindle used was #5 at 1 rpm rotational speed. Grinding Procedure After Surface Modification:

The 3 ingredients were premixed for 15 minutes. The sample was put in 1 liter 01 attritor and 850 grams of zirconia silicate (0.8 mm) was added. A 12 hour grinding period was performed. A sample of the ground mixture was taken each hour, a drawdown on Mylar was made, and relative transparency of the resulting film was measured. Results indicated that the treated sample reached 100% relative transparency after 8 hours of grinding. However, it took 11 hours of grinding for a similar sample containing untreated pigment to reach the same 100% relative transparency level.

Product testing

Lowering the viscosity of the sample is believed to be a key to reduced grinding times to achieve 100% relative transparency. After each sample achieved 100% relative transparency, the dispersion was filtered to remove grinding media and viscosity was measured using the Brookfield viscometer. Viscosities were:

|  | Untreated Pigment | Treated Pigment |
|---|---|---|
| Poise | 30 | 4 |

Examples 1 to 17

By the methods and apparatuses described herein, the following materials can be treated according to the process of this invention.

| Example | Materials | Initial Degradation Degrees C. | Reference* |
|---|---|---|---|
| 1 | diketo-pyrrolopyrrole red pigment | 461 | c |
| 2 | perylene maroon pigment | 478 | c |
| 3 | polybutadiene | 325 | a |
| 4 | polychloroprene | 170 | a |
| 5 | Natural rubber | 287 | a |
| 6 | polyethylene | 264 | a |
| 7 | polypropylene | 120 | a |
| 8 | polyacrylonitirle | 235 | a |
| 9 | polymethacrylic acid | 200 | a |
| 10 | polyvinyl acetate | 213 | a |
| 11 | polyvinyl chloride | 200 | a |
| 12 | cellulose | 250 | a |
| 13 | copper phthalocyanine blue pigment 15:2 | 460 | b |
| 14 | polychloro copper phthalocyanine C. I. pigment green 7 | 480 | b |
| 15 | quinacridone red pigment | 440 | b |
| 16 | quinacridone violet | 310 | b |
| 17 | copper phthalocyanine blue pigment 15:2 | 440 | c |

*-a. Physical Properties of Polymers Handbook, James E. Mark, AIP Press
b. NPIRI Raw Materials Data Handbook, Volume 4 Pigments, National Printing Ink Research Institute.
c. Measured by thermal gravimetric analyzer in air at a temperature gradient of 10 C./min from room temperature to 700 C..

We claim:

1. A method for treating agglomerated particulate materials comprising primary particles associated together, wherein said materials exhibit irreversible thermal degradation when heated above a threshold temperature, said method comprising the steps of:
   i introducing a plasma-activated process gas into a treatment chamber, said process gas being produced by a plasma source positioned in said treatment chamber or upstream of the treatment chamber,
   ii deagglomerating said materials into particle fractions of no more than about thirty times the average size dimension of said primary particles to expose the surfaces of substantially all of said particle fractions,
   iii contacting the particle fractions with at least one species of the plasma-activated process gas in the treatment chamber to functionalize the surfaces of substantially all of said particle fractions before reagglomeration can occur to any substantial degree, and
   iv controlling process temperature of the deagglomerated particle fractions below the threshold temperature to produce surface functionalized particle fractions.

2. The method according to claim 1 wherein the surface functionalized particle fractions are pigment particles.

3. The method according to claim 1 wherein said step iii is carried out at substantially atmospheric pressure.

4. The method according to claim 1 wherein said step iii is carried out at substantially subatmospheric pressure when said treatment chamber is downstream of the plasma source.

5. The method according to claim 1 wherein plasma from said plasma source is energized by microwave radiation radiofrequency radiation, silent discharge or by glow discharge.

6. The method according to claim 1 wherein said step ii comprises:
   mixing said agglomerated materials and a carrier gas in a mixing chamber of a deagglomeration module for partially deagglomerating said materials;
   subjecting said partially deagglomerated materials to acoustic energy produced by an ultrasonic horn energized by an ultrasonic transducer; and
   ultrasonically agitating a region immediately adjacent to an outlet orifice with sufficient energy to prevent plugging of said orifice.

7. The method according to claim 2 wherein said pigment particles reagglomerate in a collection assembly located at the bottom of said treatment chamber.

8. The method according to claim 1 or 2 wherein residence time of said particle fractions in said treatment chamber is less than about 2 seconds.

9. The method according to claim 2 wherein the process temperature of said pigment particles is maintained below the threshold temperature at which a pigment color shift observable by average human observer occurs.

10. The method of claim 7, further comprising
   grinding said reagglomerated pigment particles in a grinding mechanism to effect deagglomeration thereof in less than 85% of time required under identical conditions to deagglomerate said agglomerated particulate materials.

11. The method according to claim 1 further comprising diffusing said plasma-activated process gas before said step iii by passing said plasma-activated process gas through one or more diffuser plates.

12. The method according to claim 1 wherein said particle fractions are entrained in a carrier gas for conveying said particle fractions to said treatment chamber.

13. The method according to claim 1 wherein said surface functionalized particle fractions fall to a collection assembly located at the bottom of said treatment chamber.

14. The method according to claim 1 wherein said plasma-activated process gas is one or more process gases selected from the group consisting of oxygen, nitrogen, water vapor, hydrogen peroxide, carbon dioxide, ammonia, ozone, carbon monoxide, trimethylsilane, tetraetoxysilane, hexamethyldisiloxane, ethylene diamine, maleic anhydride, arylamine, acetylene, methane, ethylene oxide, hydrogen, styrene, air, sulfur dioxide, sulfonyl precursors, phosphonyl precursors, and alcohols.

15. A color composition comprising a binder and surface functionalized particle fractions produced by the method of claim 1, the composition having the following property:
   viscosity less than one-half that of a color composition containing said binder and said deagglomerated particle fractions.

16. A color composition comprising a binder and surface functionalized particle fractions produced by the method of claim 1, the composition having the following property:
   improved tinting strength at least 2% above that of a color composition containing said binder and said deagglomerated particle fractions.

17. A color composition comprising a binder and surface functionalized particle fractions produced by the method of claim 1, the composition having the following property:
   increased pigment to binder ratio at least about 5% above that of a color composition containing said binder and said deagglomerated particle fractions.

* * * * *